(12) United States Patent
Patel et al.

(10) Patent No.: US 8,508,401 B1
(45) Date of Patent: Aug. 13, 2013

(54) DELAY FIXING FOR COMMAND CODES IN A REMOTE CONTROL SYSTEM

(75) Inventors: Sneha Patel, Mississauga (CA); Tate Postnikoff, Mississauga (CA); Omar Echevers, Toronto (CA); Stephen Galbraith, Etobicoke (CA); Mark Connolly, Stoney Creek (CA)

(73) Assignee: Logitech Europe S.A., Morges (CH)

( * ) Notice: Subject to any disclaimer, the term of this patent is extended or adjusted under 35 U.S.C. 154(b) by 202 days.

(21) Appl. No.: 12/872,773

(22) Filed: Aug. 31, 2010

(51) Int. Cl.
  *H04L 17/02* (2006.01)

(52) U.S. Cl.
  USPC .......................................................... 341/176

(58) Field of Classification Search
  USPC .................. 340/12.22, 12.5; 341/176, 178; 455/150.1, 151.4
  See application file for complete search history.

(56) References Cited

U.S. PATENT DOCUMENTS

| | | | |
|---|---|---|---|
| 3,597,531 A | 8/1971 | Marinis et al. | |
| 3,990,012 A | 11/1976 | Karnes | |
| 4,174,517 A | 11/1979 | Mandel | |
| 4,231,031 A | 10/1980 | Crowther et al. | |
| 4,287,676 A | 9/1981 | Weinhaus | |
| 4,377,870 A | 3/1983 | Anderson et al. | |
| 4,392,022 A | 7/1983 | Carlson | |
| 4,394,691 A | 7/1983 | Amano et al. | |
| 4,475,123 A | 10/1984 | Dumbauld et al. | |
| 4,488,179 A | 12/1984 | Krueger et al. | |
| 4,566,034 A | 1/1986 | Harger et al. | |
| 4,567,512 A | 1/1986 | Abraham | |
| 4,592,546 A | 6/1986 | Fascenda et al. | |
| 4,623,887 A | 11/1986 | Welles, II | |
| 4,626,848 A | 12/1986 | Ehlers | |
| 4,703,359 A | 10/1987 | Rumbolt et al. | |
| 4,706,121 A | 11/1987 | Young | |
| 4,712,105 A | 12/1987 | Kohler | |

(Continued)

FOREIGN PATENT DOCUMENTS

| | | |
|---|---|---|
| AU | 6626790 A | 4/1992 |
| AU | 200169851 A1 | 1/2002 |

(Continued)

OTHER PUBLICATIONS

Full House Control Corp., RHOC for Windows [online] 1997. [retrieved on Apr. 29, 1998]. Retrieved from the Internet: <URL: www.fullhouse.com/rhocwin.html>.

(Continued)

*Primary Examiner* — Steven J Mottola
(74) *Attorney, Agent, or Firm* — Kilpatrick Townsend & Stockton LLP

(57) ABSTRACT

A remote control method for adjusting the temporal length between first and second command codes for an activity includes transmitting the first command code and transmitting the second command code after a first temporal length to an appliance. The method includes determining whether the appliance executed the second command code including: i) if the remote control receives an input that the appliance executed the second command code, the first temporal length is stored in memory and used for subsequently requests for the activity, or if the remote control receives an input that the appliance did not execute the second command code, the first temporal length is lengthened to a second temporal length. Until the first temporal length is not lengthened to the second temporal length, the remote control repeats the transmitting steps, and the determining step where the first temporal length for the second transmitting step is substituted with the second temporal length.

51 Claims, 9 Drawing Sheets

(56) References Cited

U.S. PATENT DOCUMENTS

| | | |
|---|---|---|
| 4,728,949 A | 3/1988 | Platte et al. |
| 4,746,919 A | 5/1988 | Reitmeier |
| 4,774,511 A | 9/1988 | Rumbolt et al. |
| 4,792,972 A | 12/1988 | Cook, Jr. |
| 4,799,141 A | 1/1989 | Drusinsky et al. |
| 4,807,031 A | 2/1989 | Broughton et al. |
| 4,825,200 A | 4/1989 | Evans et al. |
| 4,825,209 A | 4/1989 | Sasaki et al. |
| 4,837,627 A | 6/1989 | Mengel |
| 4,845,491 A | 7/1989 | Fascenda et al. |
| 4,857,898 A | 8/1989 | Smith |
| 4,866,434 A | 9/1989 | Keenan |
| 4,876,592 A | 10/1989 | Von Kohorn |
| 4,888,709 A | 12/1989 | Revesz et al. |
| 4,899,370 A | 2/1990 | Kameo et al. |
| 4,918,439 A | 4/1990 | Wozniak et al. |
| 4,941,090 A | 7/1990 | McCarthy |
| 4,959,719 A | 9/1990 | Strubbe et al. |
| 4,959,810 A | 9/1990 | Darbee et al. |
| RE33,369 E | 10/1990 | Hashimoto |
| 4,962,466 A | 10/1990 | Revesz et al. |
| 4,989,081 A | 1/1991 | Miyagawa et al. |
| 4,999,622 A | 3/1991 | Amano et al. |
| 5,001,554 A | 3/1991 | Johnson et al. |
| 5,016,272 A | 5/1991 | Stubbs et al. |
| 5,033,079 A | 7/1991 | Catron et al. |
| 5,038,401 A | 8/1991 | Inotsume |
| 5,046,093 A | 9/1991 | Wachob |
| 5,065,235 A | 11/1991 | Iijima |
| 5,065,251 A | 11/1991 | Shuhart et al. |
| 5,089,885 A | 2/1992 | Clark |
| 5,097,249 A | 3/1992 | Yamamoto |
| 5,109,222 A | 4/1992 | Welty |
| 5,115,236 A | 5/1992 | Koehler |
| 5,117,355 A | 5/1992 | McCarthy |
| 5,128,752 A | 7/1992 | Von Kohorn |
| 5,132,679 A | 7/1992 | Kubo et al. |
| 5,140,326 A | 8/1992 | Bacrania et al. |
| 5,151,789 A | 9/1992 | Young |
| 5,161,023 A | 11/1992 | Keenan |
| 5,177,461 A | 1/1993 | Budzyna et al. |
| 5,202,826 A | 4/1993 | McCarthy |
| 5,204,768 A | 4/1993 | Tsakiris et al. |
| 5,206,722 A | 4/1993 | Kwan |
| 5,220,420 A | 6/1993 | Hoarty et al. |
| 5,228,077 A | 7/1993 | Darbee |
| 5,237,327 A | 8/1993 | Saitoh et al. |
| 5,249,044 A | 9/1993 | Von Kohorn |
| 5,251,048 A | 10/1993 | Doane et al. |
| 5,255,313 A | 10/1993 | Darbee |
| 5,272,418 A | 12/1993 | Howe et al. |
| 5,282,028 A | 1/1994 | Johnson et al. |
| 5,285,278 A | 2/1994 | Holman |
| 5,287,181 A | 2/1994 | Holman |
| 5,287,268 A | 2/1994 | McCarthy |
| 5,297,204 A | 3/1994 | Levine |
| 5,341,166 A | 8/1994 | Garr et al. |
| 5,353,121 A | 10/1994 | Young et al. |
| 5,355,480 A | 10/1994 | Smith et al. |
| 5,367,316 A | 11/1994 | Ikezaki |
| 5,374,999 A | 12/1994 | Chuang et al. |
| 5,381,991 A | 1/1995 | Stocker |
| 5,382,947 A | 1/1995 | Thaler et al. |
| 5,384,067 A | 1/1995 | Doane et al. |
| 5,404,393 A | 4/1995 | Remillard |
| 5,406,558 A | 4/1995 | Rovira et al. |
| 5,410,326 A | 4/1995 | Goldstein |
| 5,410,367 A | 4/1995 | Zahavi et al. |
| 5,410,543 A | 4/1995 | Seitz et al. |
| 5,410,580 A | 4/1995 | Seino |
| 5,414,426 A | 5/1995 | O'Donnell et al. |
| 5,414,761 A | 5/1995 | Darbee |
| 5,416,535 A | 5/1995 | Sato et al. |
| 5,418,424 A | 5/1995 | Aprile et al. |
| 5,422,783 A | 6/1995 | Darbee |
| 5,446,551 A | 8/1995 | Kawaguchi et al. |
| 5,450,079 A | 9/1995 | Dunaway |
| 5,455,570 A | 10/1995 | Cook et al. |
| 5,461,667 A | 10/1995 | Remillard |
| 5,479,266 A | 12/1995 | Young et al. |
| 5,479,268 A | 12/1995 | Young et al. |
| 5,481,251 A | 1/1996 | Buys et al. |
| 5,481,256 A | 1/1996 | Darbee et al. |
| 5,483,276 A | 1/1996 | Brooks et al. |
| 5,497,185 A | 3/1996 | Dufresne et al. |
| 5,500,681 A | 3/1996 | Jones |
| 5,500,794 A | 3/1996 | Fujita et al. |
| 5,502,504 A | 3/1996 | Marshall et al. |
| 5,504,475 A | 4/1996 | Houdou et al. |
| 5,510,828 A | 4/1996 | Lutterbach et al. |
| 5,515,052 A | 5/1996 | Darbee |
| 5,515,106 A | 5/1996 | Chaney et al. |
| 5,515,270 A | 5/1996 | Weinblatt |
| 5,517,254 A | 5/1996 | Monta et al. |
| 5,523,794 A | 6/1996 | Mankovitz et al. |
| 5,523,796 A | 6/1996 | Marshall et al. |
| 5,524,141 A | 6/1996 | Braun et al. |
| 5,524,195 A | 6/1996 | Clanton, III et al. |
| 5,528,304 A | 6/1996 | Cherrick et al. |
| 5,532,689 A | 7/1996 | Bueno |
| 5,532,732 A | 7/1996 | Yuen et al. |
| 5,532,754 A | 7/1996 | Young et al. |
| 5,537,106 A | 7/1996 | Mitsuhashi |
| 5,537,107 A | 7/1996 | Funado |
| 5,537,463 A | 7/1996 | Escobosa et al. |
| 5,539,393 A | 7/1996 | Barfod |
| 5,550,576 A | 8/1996 | Klosterman |
| 5,552,837 A | 9/1996 | Mankovitz |
| 5,552,917 A | 9/1996 | Darbee et al. |
| 5,557,338 A | 9/1996 | Maze et al. |
| 5,557,721 A | 9/1996 | Fite et al. |
| 5,559,548 A | 9/1996 | Davis et al. |
| 5,566,353 A | 10/1996 | Cho et al. |
| 5,568,367 A | 10/1996 | Park |
| 5,576,755 A | 11/1996 | Davis et al. |
| 5,576,768 A | 11/1996 | Gomikawa |
| 5,579,055 A | 11/1996 | Hamilton et al. |
| 5,579,221 A | 11/1996 | Mun |
| 5,583,491 A | 12/1996 | Kim |
| 5,585,838 A | 12/1996 | Lawler et al. |
| 5,585,866 A | 12/1996 | Miller et al. |
| 5,589,892 A | 12/1996 | Knee et al. |
| 5,592,551 A | 1/1997 | Lett et al. |
| 5,596,373 A | 1/1997 | White et al. |
| 5,600,573 A | 2/1997 | Hendricks et al. |
| 5,603,078 A | 2/1997 | Henderson et al. |
| 5,604,616 A | 2/1997 | Dunn et al. |
| 5,604,923 A | 2/1997 | Wilkus |
| 5,608,446 A | 3/1997 | Carr et al. |
| 5,614,906 A | 3/1997 | Hayes et al. |
| 5,619,196 A | 4/1997 | Escobosa |
| 5,619,251 A | 4/1997 | Kuroiwa et al. |
| 5,625,608 A | 4/1997 | Grewe et al. |
| 5,627,567 A | 5/1997 | Davidson |
| 5,629,733 A | 5/1997 | Youman et al. |
| 5,629,868 A | 5/1997 | Tessier et al. |
| 5,631,652 A | 5/1997 | Lee |
| 5,638,050 A | 6/1997 | Sacca et al. |
| 5,638,113 A | 6/1997 | Lappington et al. |
| 5,646,608 A | 7/1997 | Shintani |
| 5,650,831 A | 7/1997 | Farwell |
| 5,663,757 A | 9/1997 | Morales |
| 5,671,267 A | 9/1997 | August et al. |
| 5,677,711 A | 10/1997 | Kuo |
| 5,684,526 A | 11/1997 | Yoshinobu |
| 5,686,891 A | 11/1997 | Sacca et al. |
| 5,689,353 A | 11/1997 | Darbee et al. |
| 5,691,795 A | 11/1997 | Doane et al. |
| 5,695,400 A | 12/1997 | Fennell et al. |
| 5,710,601 A | 1/1998 | Marshall et al. |
| 5,710,605 A | 1/1998 | Nelson |
| 5,721,597 A | 2/1998 | Kakinuma et al. |
| 5,734,838 A | 3/1998 | Robinson et al. |
| 5,761,601 A | 6/1998 | Nemirofsky et al. |

| | | |
|---|---|---|
| 5,768,680 A | 6/1998 | Thomas |
| 5,774,172 A | 6/1998 | Kapell et al. |
| 5,778,256 A | 7/1998 | Darbee |
| 5,781,894 A | 7/1998 | Petrecca et al. |
| 5,786,814 A | 7/1998 | Moran et al. |
| 5,794,210 A | 8/1998 | Goldhaber et al. |
| 5,796,832 A | 8/1998 | Kawan |
| 5,800,268 A | 9/1998 | Molnick |
| 5,806,065 A | 9/1998 | Lomet |
| 5,815,086 A | 9/1998 | Ivie et al. |
| 5,819,034 A | 10/1998 | Joseph et al. |
| 5,819,294 A | 10/1998 | Chambers |
| 5,822,123 A | 10/1998 | Davis et al. |
| 5,828,318 A | 10/1998 | Cesar |
| 5,828,945 A | 10/1998 | Klosterman |
| 5,832,296 A | 11/1998 | Wang et al. |
| 5,847,798 A | 12/1998 | Yang et al. |
| 5,850,249 A | 12/1998 | Massetti et al. |
| 5,855,008 A | 12/1998 | Goldhaber et al. |
| 5,870,030 A | 2/1999 | Deluca et al. |
| 5,870,683 A | 2/1999 | Wells et al. |
| RE36,119 E | 3/1999 | Kunishima et al. |
| 5,883,680 A | 3/1999 | Nykerk |
| 5,886,691 A | 3/1999 | Furuya et al. |
| 5,907,322 A | 5/1999 | Kelly et al. |
| 5,909,183 A | 6/1999 | Borgstahl et al. |
| 5,923,016 A | 7/1999 | Fredregill et al. |
| 5,940,073 A | 8/1999 | Klosterman et al. |
| 5,943,228 A | 8/1999 | Kim |
| 5,946,646 A | 8/1999 | Schena et al. |
| 5,949,351 A | 9/1999 | Hahm |
| 5,953,144 A | 9/1999 | Darbee et al. |
| 5,959,751 A | 9/1999 | Darbee et al. |
| 5,963,145 A | 10/1999 | Escobosa |
| 5,999,207 A | 12/1999 | Rodriguez et al. |
| 6,002,443 A | 12/1999 | Iggulden |
| 6,002,450 A | 12/1999 | Darbee et al. |
| 6,008,802 A | 12/1999 | Iki et al. |
| 6,009,410 A | 12/1999 | LeMole et al. |
| 6,012,088 A | 1/2000 | Li et al. |
| 6,014,092 A | 1/2000 | Darbee et al. |
| 6,040,829 A | 3/2000 | Croy et al. |
| 6,057,872 A | 5/2000 | Candelore |
| 6,073,374 A | 6/2000 | Tingmo |
| 6,097,309 A | 8/2000 | Hayes et al. |
| 6,097,441 A | 8/2000 | Allport |
| 6,097,520 A | 8/2000 | Kadnier |
| 6,104,334 A | 8/2000 | Allport |
| 6,127,941 A | 10/2000 | Van Ryzin |
| 6,130,625 A | 10/2000 | Harvey |
| 6,130,726 A | 10/2000 | Darbee et al. |
| 6,133,847 A | 10/2000 | Yang |
| 6,134,512 A | 10/2000 | Barrett |
| 6,144,315 A | 11/2000 | Flick |
| 6,144,375 A | 11/2000 | Jain et al. |
| 6,147,677 A | 11/2000 | Escobosa et al. |
| 6,148,241 A | 11/2000 | Ludtke et al. |
| 6,154,204 A | 11/2000 | Thompson et al. |
| 6,154,209 A | 11/2000 | Naughton et al. |
| 6,157,319 A | 12/2000 | Johns et al. |
| 6,169,451 B1 | 1/2001 | Kim |
| 6,173,330 B1 | 1/2001 | Guo et al. |
| 6,177,931 B1 | 1/2001 | Alexander et al. |
| 6,195,033 B1 | 2/2001 | Darbee et al. |
| 6,198,479 B1 | 3/2001 | Humpleman et al. |
| 6,198,481 B1 | 3/2001 | Urano et al. |
| 6,208,341 B1 | 3/2001 | Van Ee et al. |
| 6,211,870 B1 | 4/2001 | Foster |
| 6,223,348 B1 | 4/2001 | Hayes et al. |
| 6,225,938 B1 | 5/2001 | Hayes et al. |
| 6,243,035 B1 | 6/2001 | Walter et al. |
| 6,255,961 B1 | 7/2001 | Van Ryzin et al. |
| 6,263,346 B1 | 7/2001 | Rodriquez |
| 6,271,831 B1 | 8/2001 | Escobosa et al. |
| 6,275,268 B1 | 8/2001 | Ellis et al. |
| 6,278,499 B1 | 8/2001 | Darbee et al. |
| 6,288,799 B1 | 9/2001 | Sekiguchi |
| 6,326,947 B1 | 12/2001 | Capps |
| 6,330,091 B1 | 12/2001 | Escobosa et al. |
| 6,369,803 B2 | 4/2002 | Brisebois et al. |
| 6,374,404 B1 | 4/2002 | Brotz et al. |
| 6,397,187 B1 | 5/2002 | Vriens et al. |
| 6,407,779 B1 | 6/2002 | Herz |
| 6,408,435 B1 | 6/2002 | Sato |
| 6,445,306 B1 | 9/2002 | Trovato et al. |
| 6,469,633 B1 | 10/2002 | Wachter |
| 6,483,548 B1 | 11/2002 | Allport |
| 6,483,906 B1 | 11/2002 | Iggulden et al. |
| 6,496,135 B1 | 12/2002 | Darbee |
| 6,496,927 B1 | 12/2002 | McGrane et al. |
| 6,504,580 B1 | 1/2003 | Thompson et al. |
| 6,522,262 B1 | 2/2003 | Hayes et al. |
| 6,532,592 B1 | 3/2003 | Shintani et al. |
| 6,538,556 B1 | 3/2003 | Kawajiri |
| 6,563,430 B1 | 5/2003 | Kemink et al. |
| 6,567,011 B1 | 5/2003 | Young et al. |
| 6,567,984 B1 | 5/2003 | Allport |
| 6,587,067 B2 | 7/2003 | Darbee et al. |
| 6,597,374 B1 | 7/2003 | Baker et al. |
| 6,628,340 B1 | 9/2003 | Graczyk et al. |
| 6,629,077 B1 | 9/2003 | Arling et al. |
| 6,637,028 B1 | 10/2003 | Voyticky et al. |
| 6,640,144 B1 | 10/2003 | Huang et al. |
| 6,642,852 B2 | 11/2003 | Dresti et al. |
| 6,650,247 B1 | 11/2003 | Hayes |
| 6,657,679 B2 | 12/2003 | Hayes et al. |
| 6,690,290 B2 | 2/2004 | Young et al. |
| 6,690,392 B1 | 2/2004 | Wugoski |
| 6,701,091 B2 | 3/2004 | Escobosa et al. |
| 6,701,400 B2 | 3/2004 | Hayes et al. |
| 6,720,904 B1 | 4/2004 | Darbee |
| 6,722,984 B1 | 4/2004 | Sweeney, Jr. et al. |
| 6,724,339 B2 | 4/2004 | Conway et al. |
| 6,747,591 B1 | 6/2004 | Lilleness et al. |
| 6,748,248 B1 | 6/2004 | Pan et al. |
| 6,748,462 B2 | 6/2004 | Dubil et al. |
| 6,759,967 B1 | 7/2004 | Staller |
| 6,781,518 B1 | 8/2004 | Hayes et al. |
| 6,781,638 B1 | 8/2004 | Hayes |
| 6,784,804 B1 | 8/2004 | Hayes et al. |
| 6,784,805 B2 | 8/2004 | Harris et al. |
| 6,785,579 B2 | 8/2004 | Huang et al. |
| 6,788,241 B2 | 9/2004 | Arling et al. |
| 6,813,619 B2 | 11/2004 | Devara |
| 6,826,370 B2 | 11/2004 | Escobosa et al. |
| 6,828,992 B1 | 12/2004 | Freeman et al. |
| 6,829,512 B2 | 12/2004 | Huang et al. |
| 6,829,992 B2 | 12/2004 | Kobayashi et al. |
| 6,842,653 B2 | 1/2005 | Weishut et al. |
| 6,847,101 B2 | 1/2005 | Fjelstad et al. |
| 6,859,197 B2 | 2/2005 | Klein et al. |
| 6,862,741 B2 | 3/2005 | Grooters |
| 6,870,463 B2 | 3/2005 | Dresti et al. |
| 6,874,037 B1 | 3/2005 | Abram et al. |
| 6,882,299 B1 | 4/2005 | Allport |
| 6,882,729 B2 | 4/2005 | Arling et al. |
| 6,885,952 B1 | 4/2005 | Hayes |
| 6,917,302 B2 | 7/2005 | Lilleness et al. |
| 6,933,833 B1 | 8/2005 | Darbee |
| 6,938,101 B2 | 8/2005 | Hayes et al. |
| 6,946,988 B2 | 9/2005 | Edwards et al. |
| 6,947,101 B2 | 9/2005 | Arling |
| 6,968,570 B2 | 11/2005 | Hayes et al. |
| 6,980,150 B2 | 12/2005 | Conway et al. |
| 7,005,979 B2 | 2/2006 | Haughawout et al. |
| 7,009,528 B2 | 3/2006 | Griep |
| 7,010,805 B2 | 3/2006 | Hayes et al. |
| 7,013,434 B2 | 3/2006 | Masters et al. |
| RE39,059 E | 4/2006 | Foster |
| 7,046,161 B2 | 5/2006 | Hayes |
| 7,079,113 B2 | 7/2006 | Hayes et al. |
| 7,091,898 B2 | 8/2006 | Arling et al. |
| 7,093,003 B2 | 8/2006 | Yuh et al. |
| 7,102,688 B2 | 9/2006 | Hayes et al. |
| 7,119,710 B2 | 10/2006 | Hayes et al. |
| 7,126,468 B2 | 10/2006 | Arling et al. |
| 7,129,995 B2 | 10/2006 | Arling |
| 7,135,985 B2 | 11/2006 | Woolgar et al. |

| Patent No. | Date | Inventor |
|---|---|---|
| 7,136,709 B2 | 11/2006 | Arling et al. |
| 7,142,127 B2 | 11/2006 | Hayes et al. |
| 7,142,934 B2 | 11/2006 | Janik |
| 7,142,935 B2 | 11/2006 | Janik |
| 7,143,214 B2 | 11/2006 | Hayes et al. |
| 7,151,528 B2 | 12/2006 | Taylor et al. |
| 7,154,428 B2 | 12/2006 | de Clercq et al. |
| 7,154,483 B2 | 12/2006 | Kobayashi |
| 7,155,305 B2 | 12/2006 | Hayes et al. |
| 7,161,524 B2 | 1/2007 | Nguyen |
| 7,167,765 B2 | 1/2007 | Janik |
| 7,167,913 B2 | 1/2007 | Chambers |
| 7,193,661 B2 | 3/2007 | Dresti et al. |
| 7,200,357 B2 | 4/2007 | Janik et al. |
| 7,209,116 B2 | 4/2007 | Gates et al. |
| 7,218,243 B2 | 5/2007 | Hayes et al. |
| 7,221,306 B2 | 5/2007 | Young |
| 7,224,903 B2 | 5/2007 | Colmenarez et al. |
| RE39,716 E | 7/2007 | Huang et al. |
| 7,253,765 B2 | 8/2007 | Edwards et al. |
| 7,254,777 B2 | 8/2007 | Hayes et al. |
| 7,266,701 B2 | 9/2007 | Hayes et al. |
| 7,266,777 B2 | 9/2007 | Scott et al. |
| 7,268,694 B2 | 9/2007 | Hayes et al. |
| 7,274,303 B2 | 9/2007 | Dresti et al. |
| 7,281,262 B2 | 10/2007 | Hayes et al. |
| 7,283,059 B2 | 10/2007 | Harris et al. |
| 7,319,409 B2 | 1/2008 | Hayes et al. |
| 7,319,426 B2 | 1/2008 | Garfio |
| 7,363,028 B2 | 4/2008 | de Clerq et al. |
| 7,379,778 B2 | 5/2008 | Hayes et al. |
| 7,412,653 B2 | 8/2008 | Gates |
| 7,432,916 B2 | 10/2008 | Janik |
| 7,436,319 B1 | 10/2008 | Harris et al. |
| 7,460,050 B2 | 12/2008 | Alvarado et al. |
| 7,471,281 B2 | 12/2008 | Masters et al. |
| 7,478,079 B2 | 1/2009 | Robertson et al. |
| 7,525,289 B2 | 4/2009 | Janik et al. |
| 7,548,246 B2 | 6/2009 | Huang et al. |
| 7,549,008 B2 | 6/2009 | Kalayjian |
| 7,562,128 B1 | 7/2009 | Caris et al. |
| 7,574,693 B1 | 8/2009 | Kemink |
| 7,586,398 B2 | 9/2009 | Huang et al. |
| 7,590,999 B2 | 9/2009 | Perlman |
| 7,610,555 B2 | 10/2009 | Klein et al. |
| 7,612,685 B2 | 11/2009 | Harris et al. |
| 7,652,844 B2 | 1/2010 | Edwards et al. |
| 7,653,212 B2 | 1/2010 | Haughawout et al. |
| 7,743,012 B2 | 6/2010 | Chambers et al. |
| 7,746,244 B2 | 6/2010 | Wouters |
| 7,746,324 B2 | 6/2010 | Gates et al. |
| 7,764,190 B2 | 7/2010 | Mortensen |
| 7,765,245 B2 | 7/2010 | Nichols et al. |
| 7,768,234 B2 | 8/2010 | Janik et al. |
| 7,783,676 B2 | 8/2010 | Lim et al. |
| 7,825,995 B2 | 11/2010 | Dresti et al. |
| 7,831,930 B2 | 11/2010 | Dresti et al. |
| 7,872,642 B2 | 1/2011 | Hayes et al. |
| 7,876,255 B2 | 1/2011 | Conway, Jr. et al. |
| 7,877,705 B2 | 1/2011 | Chambers et al. |
| 7,889,095 B1 | 2/2011 | Harris et al. |
| 7,895,532 B2 | 2/2011 | Scott et al. |
| 7,904,579 B2 | 3/2011 | Janik et al. |
| 7,907,222 B2 | 3/2011 | Haughawout et al. |
| 7,920,824 B2 | 4/2011 | Janik et al. |
| 7,941,786 B2 | 5/2011 | Scott et al. |
| 7,944,370 B1 | 5/2011 | Harris et al. |
| 8,026,789 B2 | 9/2011 | Harris et al. |
| 8,063,923 B2 | 11/2011 | Lilleness et al. |
| 8,098,140 B1 | 1/2012 | Escobosa et al. |
| 8,149,218 B2 | 4/2012 | Garfio et al. |
| 8,176,432 B2 | 5/2012 | Klein et al. |
| 8,253,532 B2 | 8/2012 | Klein et al. |
| 8,254,576 B2 | 8/2012 | Arling et al. |
| 8,255,968 B2 | 8/2012 | Louie et al. |
| 8,266,667 B2 | 9/2012 | O'Donnell et al. |
| 8,321,466 B2 | 11/2012 | Black et al. |
| 8,330,582 B2 | 12/2012 | Harris et al. |
| 2001/0033243 A1 | 10/2001 | Harris et al. |
| 2002/0008789 A1 | 1/2002 | Harris et al. |
| 2002/0046083 A1 | 4/2002 | Ondeck |
| 2002/0056084 A1 | 5/2002 | Harris et al. |
| 2002/0130834 A1 | 9/2002 | Madarasz et al. |
| 2002/0151327 A1 | 10/2002 | Levitt |
| 2002/0170073 A1 | 11/2002 | Miller et al. |
| 2002/0184626 A1 | 12/2002 | Darbee et al. |
| 2003/0117427 A1 | 6/2003 | Haughawout et al. |
| 2003/0151538 A1 | 8/2003 | Escobosa et al. |
| 2003/0191650 A1 | 10/2003 | Turner et al. |
| 2004/0169590 A1 | 9/2004 | Haughawout et al. |
| 2004/0210933 A1 | 10/2004 | Dresti et al. |
| 2005/0097594 A1 | 5/2005 | O'Donnell et al. |
| 2005/0097618 A1 | 5/2005 | Arling et al. |
| 2005/0134578 A1 | 6/2005 | Chambers et al. |
| 2005/0210101 A1 | 9/2005 | Janik |
| 2005/0216606 A1 | 9/2005 | Hayes et al. |
| 2005/0231649 A1 | 10/2005 | Arling |
| 2005/0283814 A1 | 12/2005 | Scott et al. |
| 2006/0012488 A1 | 1/2006 | Hilbrink et al. |
| 2006/0031550 A1 | 2/2006 | Janik et al. |
| 2006/0101498 A1 | 5/2006 | Arling et al. |
| 2006/0132458 A1 | 6/2006 | Garfio et al. |
| 2006/0150120 A1 | 7/2006 | Dresti et al. |
| 2006/0192855 A1 | 8/2006 | Harris et al. |
| 2006/0200538 A1 | 9/2006 | Yuh et al. |
| 2006/0259183 A1 | 11/2006 | Hayes et al. |
| 2006/0262002 A1 | 11/2006 | Nguyen |
| 2006/0294217 A1 | 12/2006 | Chambers |
| 2007/0037522 A1 | 2/2007 | Liu et al. |
| 2007/0061027 A1 | 3/2007 | Janik |
| 2007/0061028 A1 | 3/2007 | Janik |
| 2007/0061029 A1 | 3/2007 | Janik |
| 2007/0063860 A1 | 3/2007 | Escobosa et al. |
| 2007/0077784 A1 | 4/2007 | Kalayjian et al. |
| 2007/0136693 A1 | 6/2007 | Lilleness et al. |
| 2007/0258595 A1 | 11/2007 | Choy |
| 2007/0296552 A1 | 12/2007 | Huang et al. |
| 2008/0005764 A1 | 1/2008 | Arling et al. |
| 2008/0016467 A1 | 1/2008 | Chambers et al. |
| 2008/0036642 A1 | 2/2008 | Harris et al. |
| 2008/0062033 A1 | 3/2008 | Harris et al. |
| 2008/0068247 A1 | 3/2008 | Harris et al. |
| 2008/0198059 A1 | 8/2008 | Harris et al. |
| 2008/0302582 A1 | 12/2008 | Sekhri et al. |
| 2009/0224955 A1* | 9/2009 | Bates et al. ................... 341/175 |
| 2011/0133976 A1 | 6/2011 | Harris et al. |
| 2012/0326852 A1 | 12/2012 | Harris et al. |

FOREIGN PATENT DOCUMENTS

| | | |
|---|---|---|
| CA | 2092003 A1 | 3/1992 |
| CN | 1399444 A | 2/2003 |
| CN | 1434422 A | 8/2003 |
| DE | 19520754 A1 | 12/1996 |
| EP | 103438 A1 | 3/1984 |
| EP | 308550 A2 | 11/1990 |
| EP | 0626635 A2 | 11/1994 |
| EP | 972280 A1 | 1/2000 |
| EP | 1014577 A1 | 6/2000 |
| EP | 1198069 A1 | 4/2002 |
| EP | 1777830 A1 | 4/2007 |
| FR | 2738931 A1 | 3/1997 |
| GB | 208948 A | 2/1982 |
| GB | 2175724 A | 12/1986 |
| GB | 2304217 A | 3/1997 |
| JP | 7075173 A | 3/1995 |
| JP | 7112301 B | 11/1995 |
| JP | 2002058079 A | 2/2002 |
| JP | 2002271871 A | 9/2002 |
| JP | 2003087881 A | 3/2003 |
| MX | 2003000322 A | 6/2003 |
| WO | 9312612 A1 | 6/1993 |
| WO | 9319427 A1 | 9/1993 |
| WO | 9415417 A1 | 7/1994 |
| WO | 9501056 A1 | 1/1995 |
| WO | 9501057 A1 | 1/1995 |
| WO | 9501058 A1 | 1/1995 |
| WO | 9501059 A1 | 1/1995 |
| WO | 9628903 A1 | 9/1995 |

| | | | |
|---|---|---|---|
| WO | 9532563 A1 | 11/1995 |
| WO | 9532583 A1 | 11/1995 |
| WO | 9630864 A1 | 10/1996 |
| WO | 9641448 A1 | 12/1996 |
| WO | 9723960 A1 | 7/1997 |
| WO | 9733434 A1 | 9/1997 |
| WO | 9816062 A1 | 4/1998 |
| WO | 9843158 A1 | 10/1998 |
| WO | 9844477 A1 | 10/1998 |
| WO | 9904568 A1 | 1/1999 |
| WO | 9934564 A1 | 7/1999 |
| WO | 0017738 A1 | 3/2000 |
| WO | 0028436 A1 | 5/2000 |
| WO | 0034851 A1 | 6/2000 |
| WO | 0169567 A2 | 9/2001 |
| WO | 03044684 A1 | 5/2003 |
| WO | 03045107 A1 | 5/2003 |
| WO | 03060804 A1 | 7/2003 |
| WO | 03100553 A2 | 12/2003 |

OTHER PUBLICATIONS

Full House Control Corp., The RF Base Station, [online] 1997. [retrieved on Apr. 29, 1998]. Retrieved from the Internet: <URL: www.fullhouse.com/base.html>.

Full House Control Corp., The RHOC. [online] 1997. [retrieved on Apr. 29, 1998]. Retrieved from the Internet: <URL: www.fullhouse.com/rhoc.html>.

*Universal Electronics Inc. v. Logitech Inc., Logitech International S.A. and Logitech Europe S. A.*, "Declaration of James J. Lukas, Jr. in Support of Universal Electronics Inc.'s Opening Claim Construction Brief," United States District Court Central District of California—Southern Division, Case No. SACV11-1056-JVS(Anx), May 11, 2012.

*Universal Electronics Inc. v, Logitech Inc., Logitech International S.A. and Logitech Europe S. A.*, "Declaration of James J. Lukas, Jr. in Support of Universal Electronics Inc.'s Opening Claim Construction Brief Exhibit 17a: The Prosecution History of U.S. Patent No. 6,784,805 (Part 2)," United States District Court Central District of California—Southern Division, Case No. SACV11-1056-JVS(Anx), May 11, 2012.

*Universal Electronics Inc. v. Logitech Inc., Logitech International S.A. and Logitech Europe S. A.*, "Declaration of James J Lukas, Jr. in Support of Universal Electonics Inc.'s Opening Claim Construction Brief Exhibit 17b: The Posecuton Hisory of U.S.Paent No. 6,784,805 (Part 1),"United States Disrict Court Cental District of California—Southern Division, Case No. SACV11-1056-JVS(Anx), May 11, 2012.

*Universal Electronics Inc. v. Logitech Inc., Logitech International S.A, and Logitech Europe S.A.*, "Declaration of James J. Lukas, Jr. In Support of Universal Electronics Inc.'s Opening Claim Construction Brief Exhibit 19: Various Dictionary Entries Contained in Webster's Third New International Dictionary, Unabridged," United States District Court Central District of California—Southern Division, Case No. SACV11-1056-JVS(Anx), May 11, 2012.

*Universal Electronics Inc. v. Logitech Inc., Logitech International S.A. and Logitech Europe S. A.*, "Declaration of James J. Lukas, Jr. in Support of Universal Electronics Inc.'s Opening Claim Construction Brief Exhibit 8: U.S. Patent No. 6,784,805," United States District Court Central District of California—Southern Division, Case No. SACV11-1056-JVS(Anx), May 11, 2012.

*Universal Electronics Inc. v. Logitech Inc., Logitech International S.A. and Logitech Europe S. A.*, "Declaration of James J. Lukas, Jr. in Support of Universal Electronics Inc.'s Responsive Claim Construction Brief," United States District Court Central District of California—Southern Division, Case No. SACV11-1056-JVS(Anx), Jun. 15, 2012.

*Universal Electronics Inc. v. Logitech Inc., Logitech International S.A. and Logitech Europe S. A.*, "Declaration of Robert J. Artuz in Support of Logitech, Inc., Logitech International S.A. and Logitech Europe S.A.'s Opening Claim Construction Brief Exhibit 26: Office action Excerpts (Sep. 25, 2003, pp. 4-6) from the Prosecution History of U.S. Patent No. 6,784,805," United States District Court Central District of California—Southern Division, Case No. SACV11-1056-JVS(Anx), May 11, 2012.

*Universal Electronics Inc. v, Logitech Inc., Logitech International S.A. and Logitech Europe S. A.*, "Declaration of Robert J. Artuz in Support of Logitech, Inc., Logitech International S.A. and Logitech Europe S.A,'s Opening Claim Construction Brief Exhibit 25: Application Excerpts (Mar. 1, 2001, pp. 17-19) from the Prosecution History of U.S. Patent No. 6,784,805," United States District Court Central District of California—Southern Division, Case No. SACV11-1056-JVS(Anx), May 11, 2012.

*Universal Electronics Inc. v. Logitech Inc., Logitech International S.A. and Logitech Europe S.A.*, "Declaration of Robert J. Artuz in Support of Logitech, Inc., Logitech International S.A. and Logitech Europe S.A.'s Opening Claim Construction Brief Exhibit: 27: Applicant's Response Excerpts (Dec. 4, 2003, pp. 9, 11-15, 17-18) from the Prosecution History of U.S. Patent No. 6,784,805," United States District Court Central District of California—Southern Division, Case No. SACV11-1056-JVS(Anx), May 11, 2012.

*Universal Electronics Inc. v. Logitech Inc., Logitech International S.A. and Logitech Europe S.A.*, "Declaration of Robert J. Artuz in Support of Logitech, Inc., Logitech International S.A. and Logitech Europe S.A,'s Opening Claim Construction Brief Exhibit 7: U.S. Patent No. 6,784,805," United States District Court Central District of California—Southern Division, Case No. SACV11-1056-JVS(Anx), May 11, 2012.

*Universal Electronics Inc. v. Logitech Inc., Logitech International S.A. and Logitech Europe S.A.*, "Declaration of Robert J. Artuz in Support of Logitech, Inc., Logitech International S,A. and Logitech Europe S.A,'s Opening Claim Construction Brief," United States District Court Central District of California—Southern Division, Case No. SACV11-1056-JVS(Anx), May 11, 2012.

*Universal Electronics Inc. v. Logitech Inc., Logitech International S.A. and Logitech Europe S.A.*, "Exhibit A-H: Logitech Means-Plus-Function Chart for U.S. Patent Nos. 5,255,313, 5,228,077, 5,414,761," United States District Court Central District of California—Southern Division, Case No. SACV11-1056-JVS(Anx), Apr. 27, 2012.

*Universal Electronics Inc. v. Logitech Inc., Logitech International S.A. and Logitech Europe S. A.*, "Exhibit B (Logitech Patents): Disputed Terms, Proposed Constructions and Intrinsic and Extrinsic Evidence," United States District Court Central District of California—Southern Division, Case No. SACV11-1056-JVS(Anx), Apr. 23, 2012.

*Universal Electronics Inc. v. Logitech Inc., Logitech International S.A. and Logitech Europe S.A.*, "Joint Claim Construction and Prehearing Statement Pursuant to N.D. Cal. Patent Local Rule 4-3," United States District Court Central District of California—Southern Division, Case No. SACV11-1056-JVS(Anx), Apr. 23, 2012.

*Universal Electronics Inc. v. Logitech Inc., Logitech International S.A. and Logitech Europe S.A.*, "Logitech Europe S.A.'s Disclosure of Asserted Claims and Infringement Contentions Pursuant to Patent L.R. 3-1," United States District Court Central District of California—Southern Division, Case No. SACV11-1056-JVS(Anx), Dec. 19, 2011.

*Universal Electronics Inc. v. Logitech Inc., Logitech International S.A. and Logitech Europe S.A.*, "Logitech Europe S.A.'s Disclosure of Asserted Claims and Infringement Contentions Pursuant to Patent L.R. 3-1 Exhibit 4: Infringment Contentions for U.S. Patent No. 6,784,805," United States District Court Central District of California—Southern Division, Case No. SACV11-1056-JVS(Anx), Dec. 19, 2011.

*Universal Electronics Inc. v. Logitech Inc., Logitech International S.A. and Logitech Europe S.A.*, "Logitech, Inc., Logitech International S.A., and Logitech Europe S.A.'s Response to Universal Electronics Inc.'s Opening Claim Construction Brief," United States District Court Central District of California—Southern Division, Case No. SACV11-1056-JVS(Anx), Jun. 15, 2012.

*Universal Electronics Inc. v. Logitech Inc., Logitech International S.A. and Logitech Europe S. A.*, "Logitech, Inc., Logitech International S.A. and Logitech Europe S.A.'s Opening Claim Construction Brief," United States District Court Central District of California—Southern Division, Case No. SACV11-1056-JVS(Anx), May 11, 2012.

*Universal Electronics Inc. v. Logitech Inc., Logitech International S.A. and Logitech Europe S.A.*, "Supplemental/Amended Joint Claim Construction and Prehearing Statement Pursuant to N.D. Cal. Patent Local Rule 4-3," United States District Court Central District of California—Southern Division, Case No. SACV11-1056-JVS(Anx), May 11, 2012.

*Universal Electronics Inc. v. Logitech Inc., Logitech International S.A. and Logitech Europe S.A.*, "Supplemental/Amended Joint Claim Construction and Prehearing Statement Pursuant to N.D. Cal. Patent Local Rule 4-3 Exhibit B (Logitech Patents): Disputed Terms, Proposed Constructions, and Intrinsic and Extrinsic Evidence," United States District Court Central District of California—Southern Division, Case No, SACV11-1056-JVS(Anx), May 11, 2012.

*Universal Electronics Inc. v. Logitech Inc., Logitech International S.A. and Logitech Europe S.A.*, "Universal Electronics Inc.'s invalidity Contentions," United States District Court Central District of California—Southern Division, Case No. SACV11-1056-JVS(Anx), Feb. 17, 2012.

*Universal Electronics Inc. v. Logitech Inc., Logitech International S.A. and Logitech Europe S.A.*, "Universal Electronics Inc.'s Invalidity Contentions Exhibit A: Invalidity of U.S. Patent No. 5,410,326," United States District Court Central District of California—Southern Division, Case No. SACV11-1056-JVS(Anx), Feb. 17, 2012.

*Universal Electronics Inc. v. Logitech Inc., Logitech International S.A. and Logitech Europe S.A.*, "Universal Electronics Inc.'s Opening Claim Construction Brief," United States District Court Central District of California—Southern Division, Case No. SACV11-1056-JVS(Anx), May 11, 2012.

*Universal Electronics Inc. v. Logitech Inc., Logitech International S.A. and Logitech Europe S.A.*, "Universal Electronics Inc.'s Opening Claim Construction Brief Exhibit C: Independent Asserted Claims in which the Parties Dispute One or More Claim Terms," United States District Court Central District of California—Southern Division, Case No. SACV11-1056-JVS(Anx), May 11, 2012.

*Universal Electronics Inc. v. Logitech Inc., Logitech International S.A. and Logitech Europe S.A.*, "Universal Electronics Inc.'s Opening Claim Construction Brief Exhibit D: Claim Chart of UEI's Proposed Constructions & Logitech's Proposed Constructions," United States District Court Central District of California—Southern Division, Case No. SACV11-1056-JVS(Anx), May 11, 2012.

*Universal Electronics Inc. v. Logitech Inc., Logitech International S.A. and Logitech Europe S.A.*, "Universal Electronics Inc.'s Responsive Claim Construction Brief," United States District Court Central District of California—Southern Division, Case No. SACV11-1056-JVS(Anx), Jun. 15, 2012.

Ciarcia, S., "Build a Trainable Infrared Master Controller," Byte, 12(3): 113-123 (1987).

Ciarcia, S., The Best of Ciarcia's Circuit Cellar, pp. 345-354 (1987).

Cooper, Ian and Royston Shuffiebotham, "PDA Web Browsers: Implementation Issues," Computing Laboratory, The University of Kent at Canterbury, Nov. 9, 1995, pp. 1-12.

Giannopoulos, Vassilis, "Efficient VHDL Models for Various PLD Architectures," Thesis: Department of Engineering, College of Engineering. Rochester Institute of Technology, Sep. 1995.

Inoue, et al., "A Home Automation System," IEEE Transactions on Consumer Electronics, vol. CE-31, No. 3, Aug. 1985, pp. 516-527.

Konstan, J. A., "State problems in programming human-controlled devices," Digest of Tech. Papers of Int Conf. on Consumer Electronics (ICCE), pp. 122-123 (1994).

Kuuluvainen, et al., "The Action-State Diagram: A Compact Finite State Machine Representation for User Interfaces and Small Embedded Reactive Systems," IEEE Transactions on Consumer Electronics, vol. 37, No. 3, Aug. 1991, pp. 651-658.

La Porta et al., "Challenges for Nomadic Computing: Mobility Management and Wireless Communication," Bell Laboratories, 1996, pp. 1-24.

Lexicon, Inc., Product Brochure for Lexicon 500T Product, 1994.

Muraia et al., "A Poposal or Standardization of Home Bus System for Home Automation," IEEE Transactions on Consumer Electronics, vol. CE-29, No. 4, Nov. 1983 pp. 524-530.

Niles Audio Corporation, Inc., Product Brochure for Intellicontrol Product, 1996.

Philips Electronics N.V., "ProntoEdit User Guide," Version 1.02, Oct. 1999.

Phiiips Electronics N.V., "ProntoEdit User Guide," Version 2.0, Sep. 2000.

Philips Electronics N.V., "ProntoEdit User Manual"; Version 4, Mar. 2002.

Radio Shack, Universal Remote Control Owners Manual, pp. 1-19, (1987).

Tonks, Daniel, "Phillips Award-Winning Pronto Remote Now Offers More Control for Home Entertainment Systems"; [online] Remote Central.com, 1998 [retrieved on Feb. 16, 2012]. Retrieved from the Internet: <URL: www.remotecentral.com/pronto/pedit>.

Tonks, Daniel, "Philips Revolutionizes Home Theatre Control"; [online] Remote Central.com, 1998 [retrieved on Feb. 16, 2012]. Retrieved from the Internet: <URL: www.remotecentral.com/pronto/press>.

Tritton, "Interactive Home Systems (IHS)—An Overview," IEEE Transactions on Consumer Electronics, vol. 34, No. 3, Aug. 1988, pp. 694-699.

Voelker et al., "Mobisaic, An Information System for a Mobile Wireless Computing Environment," WMCSA '94 Proceedings of the 1994 First Workshop on Mobile Computing Systems and Applications, 1994.

Yannakakis et al., "Testing Finite State Machines," ACM 089791-397-3/91/0004/0475, 1991, pp. 476-485.

Zeisel, et al., "An Interactive Menu-Driven Remote Control Unit for TV-Receivers and VC-Recorders," IEEE Transactions on Consumer Electronics, vol. 34, No. 3, Aug. 1988, pp. 814-818.

International Search Report issued in PCT/CA01/00323 mailed on Apr. 4, 2002; 7 pages.

U.S. Appl. No. 09/519,546, filed Mar. 6, 2000.

\* cited by examiner

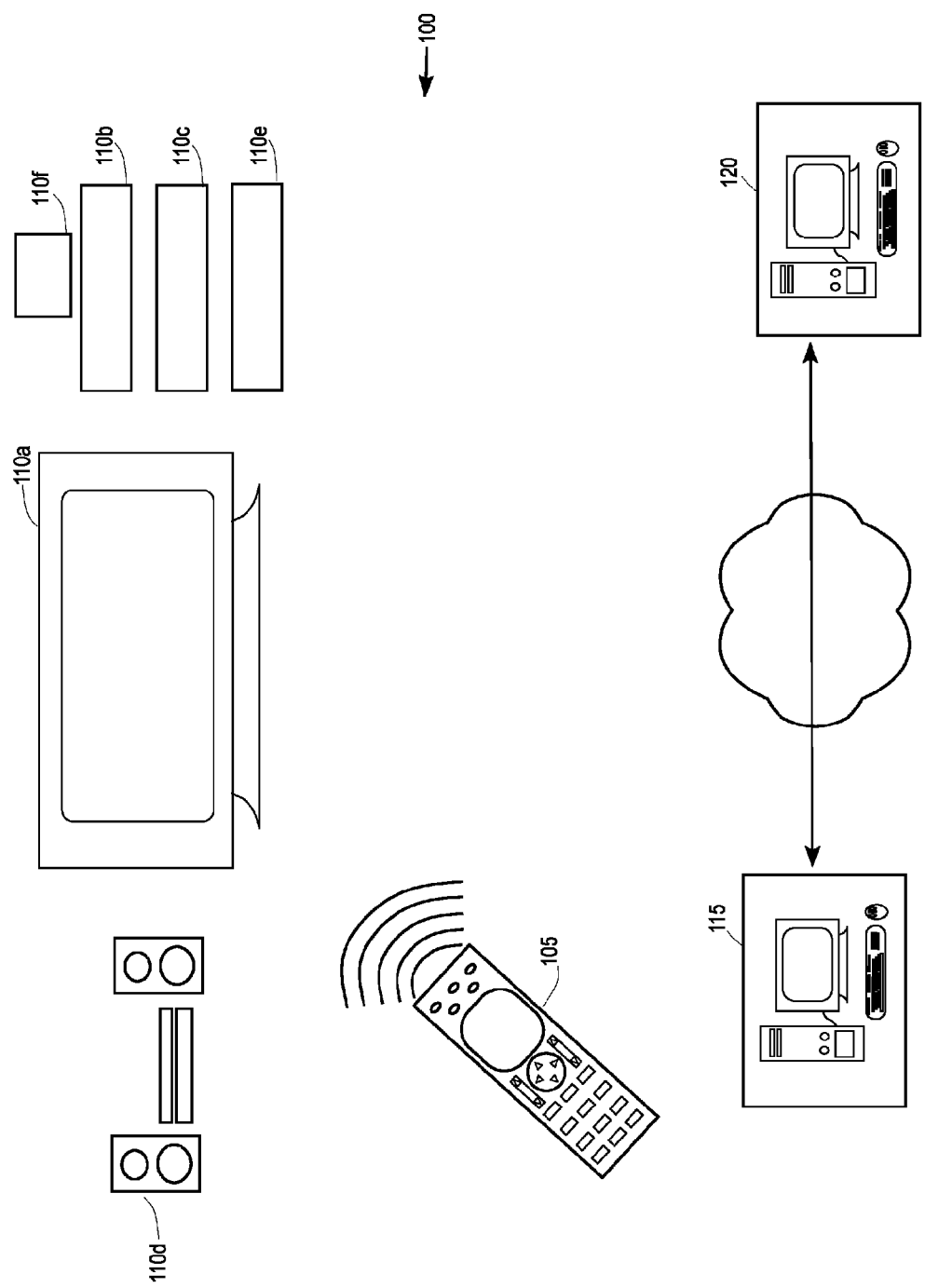

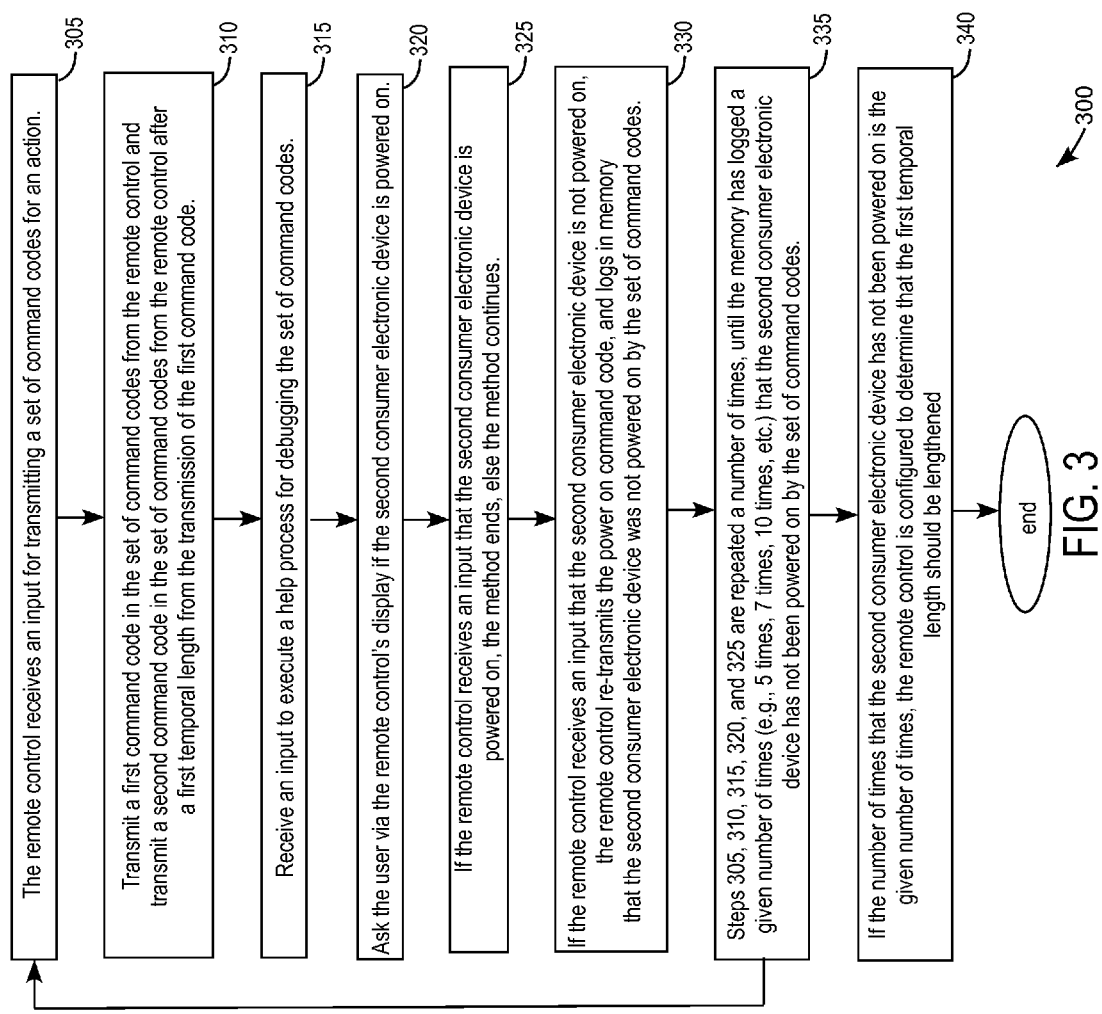

DELAY FIXING FOR COMMAND CODES IN A REMOTE CONTROL SYSTEM

CROSS REFERENCE TO RELATED APPLICATION AND PATENTS

The instant application is related to: U.S. Pat. No. 6,784,805, titled "State-Based Remote Control System" of Glen McLean Harris et al.; U.S. Pat. No. 7,436,319, titled "Method and Apparatus for Uploading and Downloading Remote Control Codes," of Glen McLean Harris et al.; U.S. patent application Ser. No. 11/408,440 filed Apr. 20, 2006, titled "System and Method for Adaptive Programming of a Remote Control," of Godwin Liu et al., each of which is incorporated by reference herein in its entirety for all purposes.

BACKGROUND OF THE INVENTION

Embodiments of the present invention generally relate to remote controls configured to control a set of appliances. More particularly, embodiments of the present invention relate to adjusting the temporal spacings between command codes that are delivered from a remote control to a set of appliances.

Remote controls are typically hand-held electronic devices that are configurable to control a number of appliances. The appliances that a remote control may be configured to control include televisions (TVs), DVD players, stereo equipment (e.g., CD players, tuners, amplifiers, etc.), personal video recorders (PVRs), set-top-boxes (cable television tuners, satellite dish tuners, etc.), surround sound devices, other remote controls (e.g., blasters), media applications on a computer, set-top-boxes, blasters, or any other type of processor, etc. Some remote controls are also configured to control a heating system, a cooling system, lighting, window coverings, and the like.

The control of numerous appliances by a remote control requires that the temporal spacing of between the command codes issued by a remote control needs to be sufficient so that the appliances receiving the command codes may adequately process the command codes so that the functions associated with the command codes may be executed by the appliances. For example, a set of command codes might be transmitted from a remote control to a TV to both turn on the TV and to change the input of the TV to the cable television input. If the temporal spacing of the command codes is too small, the TV may be able to accept the command code for turning on the TV, but may be still processing the command code for turning on the TV and when the second command code is received by the TV, the TV will not be able to accept and/or process the command code for changing the input of the television. Therefore, the set of command codes issued to the TV will not have been executed in its entirety.

While sets of command codes for controlling corresponding sets of appliances are specified by the manufacturers of the appliances, the temporal spacing between command codes for the effective use of the command codes are often empirically determined by remote control manufactures. As the temporal spacings are often empirically determined, especially for controlling disparate appliances, the temporal spacings are often not optimized. Therefore, the temporal spacings often need to be adjusted so that the functions associated with a set of command codes may be correctly executed by a set of appliances. For many remote control users it is exceeding difficult to identify that their remote controls are not operating correctly due to temporal spacing problems. Further, once a temporal spacing problem has been identified, adjusting the temporal spacings between command codes is a daunting task for many users.

Therefore, new remote controls and new remote control operation methods are needed to help users identify whether a temporal spacing problem for command codes exists. Additionally, new remote controls and new remote control operation methods are also needed to help users correct temporal spacing problems for command codes. In order to enhance a user's experience in using a remote control to control the user's set of appliances, the sequence and the timing of commands should be optimized such that the time required for the appliances to execute a set of command codes and be set to various desired states (i.e., to be operational as desired) is minimized. New remote controls are needed that further operate in cooperation with a remote server to upload optimized temporal lengths for command codes and/or optimized ordering for command codes to the remote server and the remote server's database so that the remote server may provide to other remote controls (e.g., operated by other users) the optimized temporal lengths for command codes and/or the optimized ordering for command codes.

BRIEF SUMMARY OF THE INVENTION

Embodiments of the present invention generally relate to remote controls configured to control a set of appliances. More particularly, embodiments of the present invention relate to adjusting the temporal spacings between command codes that are delivered from a remote control to a set of appliances. It is to be noted that while at various times appliances are specifically referred to herein home entertainment devices, other types of devices and applications/services can also be controlled by a remote control in accordance with the embodiments of the present invention, including but not limited to applications executed on computers, set-top boxes, personal digital assistants, cell phones, blasters, other types of processors, etc., other home devices such as blinds, lights, and so on. Embodiments of the present invention enhance a user's experience in using a remote control to control the user's set of appliances by ordering the sequence command codes and by adjusting the temporal spacing between command codes (e.g., command code optimization) such that the time required for the appliances to execute a set of command codes and be set to various desired states (i.e., to be operational as desired) is minimized. Embodiment of the present invention further provides new remote control that operate in cooperation with a remote server to upload optimized temporal lengths for command codes and/or optimized ordering for command codes to the remote server and the remote server's database so that the remote server may provide to other remote controls (e.g., operated by other users) the optimized temporal lengths for command codes and/or the optimized ordering for command codes.

According to one embodiment of the present invention, a remote control method for determining whether command code errors have occurred for an activity includes receiving an input on a remote control for directing the remote control to transmit a first command code and a second command code to a first appliance and a second appliance, respectively. The method further includes transmitting the first command code from the remote control, and thereafter transmitting the second command code from the remote control after a first temporal length from the transmission of the first command code. The method further includes determining whether the second command code was executed by the second appliance. The determining step includes: i) displaying a question on a display of the remote control regarding whether the second appliance executed the second command code; ii) if the remote control receives an input that the second appliance executed the second command code, the method is ended; iii) if the remote control receives an input that the second appliance did not execute the second command code, an indicator storing in memory that the second appliance did not execute the second command code, and the second command code is retransmitted to the appliance. Until the remote control at the determining steps stores the indicator in memory a predetermined number of times, the remote control repeats the receiving step, the first mentioned transmitting step, the second mentioned transmitting step, and the determining step. If the indicator is stored in memory the predetermined number of times, the remote control determines that the temporal length should be lengthened for the second appliance to execute the second command code.

According to another specific embodiment, the predetermined number of times is five. According to another specific embodiment, the method further includes receiving a user input on the remote control from a user to start a help process, and wherein the help process executes the determining step. The second command code is a power on command code.

According to another embodiment of the present invention, a remote control method is provided for adjusting the temporal length between a first command code and a second command code for an activity. The second command code is a power on command code for an appliance, and the first command code is not executable by the appliance. The method includes transmitting the first command code from a remote control to an appliance, and transmitting the second command code from the remote control to the appliance after a first temporal length from the transmission of the first command code. The method includes determining whether the appliance executed the second command code. The determining step includes: i) displaying on the remote control a question whether the appliance executed a function for the second command code, ii) if the remote control receives an input that the appliance executed the second command code, storing the first temporal length in memory, wherein the remote control is configured to use the first temporal length for subsequently received inputs for executing the activity, and iii) if the remote control receives an input that the appliance did not execute the second command code, lengthening on the remote control the first temporal length to a second temporal length. Until the first temporal length is not lengthened to the second temporal length or until the second temporal length is a maximum temporal length, the method includes repeating by the remote control the first mentioned transmitting step, the second mentioned transmitting step, and the determining step, wherein the first temporal length for the second mentioned transmitting step is set to the second temporal length. According to one embodiment, at step ii) above, if the remote control receives an input that the appliance executed the function for the second command code, the first time the question is asked, then the method includes: i) shortening by the remote control the first temporal length to a second temporal length; and storing by the remote control the second temporal length in memory for subsequent use by the device.

According to another specific embodiment, the method further includes determining by the remote control that the activity ended, and thereafter the executing by the remote control the first transmitting step, the second transmitting step, the determining step, and the repeating step. According to another specific embodiment, the method further includes executing by the remote control the first transmitting step, the second transmitting step, the determining step, and the repeating step after the method of summarized at paragraph [0008] is executed.

According to another specific embodiment, the method further includes transmitting from the device to a remote server the first temporal length stored in memory. According to another specific embodiment, the method further includes transmitting from the remote server the first temporal length to another device configured to control a set of appliances.

According to one embodiment of the present invention, a remote control method for determining whether command code errors have occurred for an activity includes receiving an input on a remote control for directing the remote control to transmit a first command code and a second command code to an appliance. The first command code is a power on command code. The method further includes transmitting the first command code from the remote control, and transmitting the second command code from the remote control after a first temporal length from the transmission of the first command code. The method further includes determining whether the second command code was executed by the appliance. The determining step includes: if the remote control receives an input that the appliance did not execute the second command code, then storing by the remote control in memory an indicator that the appliance did not execute the second command code, and retransmitting the second command code. The method further includes repeating by the remote control the receiving step, the first mentioned transmitting step, the second mentioned transmitting step, and the determining step, until the determining steps stores the indicator in memory a predetermined number of times. The method includes determining by the remote control that the temporal length should be lengthened for the appliance to execute the second command code if the indicator is stored in memory the predetermined number of times. According to one specific embodiment, the determining step includes: displaying a question on a display of the remote control regarding whether the appliance executed the second command code; and if the remote control receives an input that the appliance executed the second command code, the method ends. According to an alternative embodiment, if the remote control receives an input that the appliance executed the second command code after the first time that the question is displayed then the method further includes shortening by the remote control the first temporal length to a second temporal length; and storing by the remote control the second temporal length in memory for subsequent use by the device.

According to another specific embodiment, the predetermined number of times if five. According to another specific embodiment, the method includes receiving a user input on the remote control from a user to start a help process, and wherein the help process executes the determining step.

According to one embodiment of the present invention, a method is provided for adjusting the temporal length between a first command code and a second command code for an activity for an appliance. The first command code is a power on command code for an appliance. The method includes transmitting the first command code from a remote control to an appliance, and transmitting the second command code from the remote control to the appliance after a first temporal length from the transmission of the first command code. The method includes determining whether the appliance executed the second command code. The determining step includes: if the remote control receives an input that the appliance did not execute the second command code, lengthening on the remote control the first temporal length to a second temporal length. Until the first temporal length is not lengthened to the second temporal length or until the second temporal length is a maximum temporal length, the method includes repeating by the remote control the first mentioned transmitting step, the second mentioned transmitting step, and the determining step, wherein the first temporal length for the second mentioned transmitting step is set to the second temporal length. According to a specific embodiment, the determining step includes displaying on the remote control a question whether the appliance executed a function for the second command code, and if the remote control receives an input that the appliance executed the second command code, storing the first temporal length in memory, wherein the remote control is configured to use the first temporal length for subsequently received inputs for executing the activity.

According to another specific embodiment, the method further includes determining by the remote control that the activity ended, and thereafter the executing by the remote control the first transmitting step, the second transmitting step, the determining step, and the repeating step. According to another specific embodiment, the method further includes executing by the remote control the first transmitting step, the second transmitting step, the determining step, and the repeating step after the method of paragraph [0008] or paragraph [0012] is executed.

According to another specific embodiment, the method further includes transmitting from the device to a remote server the first temporal length stored in memory. According to another specific embodiment, the method further includes transmitting from the remote server the first temporal length to another device configured to control a set of appliances.

According to one embodiment of the present invention, a control device system is provided for controlling an appliance and determining a temporal length between the transmission of a first command code and a second command code so that the appliance may execute the second command code properly. The control device system includes a processor configured to execute a set of computer code instructions. The control device system further includes a memory configured to store the set of computer code instructions, a set of command codes for controlling the appliances, and a temporal length value for the temporal length between the transmission of a first command code and a second command code to the appliance. The control device system further includes an input configured to receive an instruction to transmit the first command code and the second command code to the appliance, and a transmitter configured to transmit the first command code and the second command code to the appliance. The processor is configured execute the computer code instruction to: i) direct the transmitter to transmit the first command code from a device to an appliance; ii) direct the transmitter to transmit the second command code from the device to the appliance after a first temporal length from the transmission of the first command code; iii) determine whether the appliance executed the second command code including: iiia) if the device receives an input that the appliance executed the second command code, storing the first temporal length in memory, wherein the device is configured to use the first temporal length for subsequently received inputs for executing the action; and iiib) if the device receives an input that the appliance did not execute the second command code, lengthening on the device the first temporal length to a second temporal length. Until the first temporal length is not lengthened to the second temporal length or until the second temporal length is a maximum temporal length, the processor is configured to repeat the first mentioned direction step, the second mentioned directing step, and the determining step. For the repeated executions of the first mentioned direction step, the second mentioned directing step, and the determining step, the first temporal length for the second mentioned transmitting step is set to the second temporal length.

According to one specific embodiment, the control device system is a blaster that is configured to be controlled by a remote control device and relay command codes received from the remote control device to the appliance. According to another specific embodiment, the control device system is a hand-held remote control device.

According to another specific embodiment, the appliance is a computer and the first or the second command codes are for controlling an application or service operating on the computer. According to another specific embodiment, the control device system includes a display where the processor is configured to direct the display to display on the device a question whether the appliance executed a function for the second command code. According to one embodiment, the display is a touch screen via which the control device system is configured to receive input from a user. The display is configured to receive the input in response to the questions.

According to another specific embodiment, the second command code is a power on command code for the appliance. The first command code is not executable by the appliance.

According to another specific embodiment, the processor is configured to control the transmitter to transmit the first temporal length stored in memory to a remote server. The remote server is configure to transmit the first temporal length to another control device system.

According to one embodiment of the present invention method for adjusting a set of temporal length between command codes in a set of command codes includes rearranging by a device a transmission order of commands codes in a set of command codes, and transmitting from the device the command codes with a second temporal length between the command codes that is shorter than a predetermined-first temporal length. The method further includes displaying a question on a display asking whether a set of appliances controlled by the set of command codes is in a correct state for the set of command codes. If an input is received by the device indicating that the set of appliances is in the correct state, the method includes storing by the device in memory the second temporal length.

According to one specific embodiment, the device is a hand-held remote control. Alternatively, the device is a blaster configured to communicate with a remote control. According to another specific embodiment, the method further includes transmitting from the device to a remote server the second temporal length if the input indicates that the set of appliances is in the correct state. The method may further include transmitting from the remote server the second temporal length to another device configured to control a set of appliances.

According to one embodiment of the present invention, a control device system for controlling a set of appliances includes a processor configured to rearrange a transmission order of commands codes in a set of command codes, and a transmitter coupled to the processor and configured to transmit to a set of appliances the command codes with a second temporal length between the command codes that is shorter than a predetermined-first temporal length. The control device system further includes a display coupled to the processor and configured to display a question asking whether the set of appliances is in a correct state for the set of command codes. The control device system further includes a memory coupled to the processor and configured to store the set of command codes and a set of temporal lengths. The control device further includes an input coupled to the processor and configured to receive an input indicating whether the set of appliances is in the correct state. The processor is configured to control the memory to store the second temporal length, if the input indicates that the set of appliances is in the correct state.

According to a specific embodiment, the control device system is a blaster, and is configured to be controlled by a remote control device and relay command codes to the set of appliances. Alternatively, the control device system is a handheld remote control device. The appliance is a computer for controlling an application or service operating on the computer. The display is a touch screen and includes the input, and is configured to receive the input in response to the questions. The processor is configured to control transmissions by the transmitter.

According to another specific embodiment, the control device system further includes a second transmitter configured to transmit the rearranged order of the commands codes and the second temporal length to a remote server for storage in a database. The remote server is configured to transmit the rearranged order of the commands codes and the second temporal length to other control device systems.

These and other embodiments of the present invention are described in more detail in conjunction with the text below and the attached figures.

BRIEF DESCRIPTION OF THE DRAWINGS

FIG. 1A is a simplified schematic of a remote control environment according to one embodiment of the present invention;

FIG. 3 is a high-level flow diagram of a remote control operation method 300 according to one embodiment of the present invention for determining whether command code errors have occurred;

DETAILED DESCRIPTION OF THE INVENTION

Figure 1B:
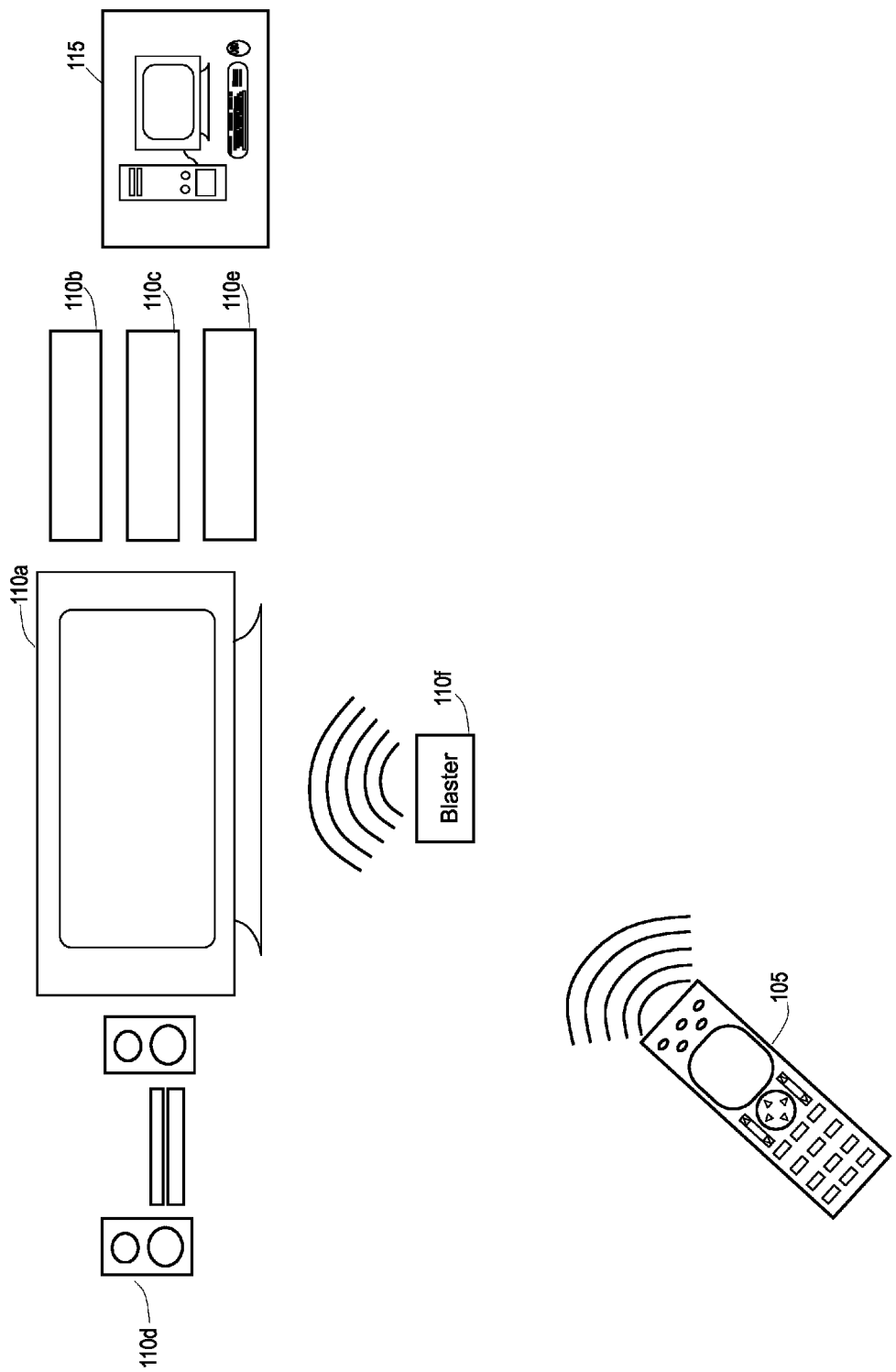
FIG. 1B is a simplified schematic of a remote control environment showing in further detail the embodiment wherein one of the appliances is a blaster and is configured to receive command codes from the remote control.

Embodiments of the present invention generally provide a remote control configured to control a set of appliances. More particularly, embodiments of the present invention relate to adjusting the temporal spacings between command codes that are delivered from a remote control to a set of appliances.

FIG. 1A is a simplified schematic of a remote control environment 100 according to one embodiment of the present invention. The remote control environment includes a remote control 105 and a set of appliances 110. A set as referred to herein includes one or more elements. Each appliance shown in FIG. 1A is labeled with the base reference number 110 and an alphabetic suffix. The remote control environment, according to one specific embodiment, includes a computer 115 that is configured to be linked to a remote server computer 120. Remote control 105 may be configured to link to remote server 120 to share collected information with the remote server, and to collect information from the remote server. Remote control 105 may be configured to link to remote server 120 through computer 115. The remote control may link to computer 115 via a variety of ways, such as via a local home RF link, a Bluetooth RF link, a cable connection (e.g., a USB connection, an HDMI connection, etc), an Internet protocol (IP) connection (e.g., via a local wireless router), etc. Alternatively, remote control 105 may be configured to link directly to the remote server 120. For instance, remote control 105 WAP (wireless access protocol) enabled and may be configured to link to the remote server via a WAP link. Computer 115 and remote server 120 may each include computer readable memories (sometimes referred to in the art as machine readable memories) on which computer code may be stored where the computer code embodies various methods of the present invention.

The set of appliances 110 may include a television 110a, a DVD player 110b, a personal video recorder (PVR) 110c, a stereo system 110d, a set-top-box 110e, a portable electronic device (e.g., a smart phone), another remote control 110f, etc. The other remote control might be a "blaster" or the like configured to receive command codes from the remote control and then transmit the received command codes to other appliances, such as a television or the like. The blaster might be included in a set-top-box or the like. According to one embodiment, remote control 105 is a blaster. A blaster may be configured to receive command codes in one format (e.g., IR), and re-transmit the command codes in another format (e.g., RF). Alternatively, a blaster may be configured to receive and transmit in the same format, such as receiving IR and transmitting IR. According to another embodiment, remote control 105 is a set-top-box configured to control other appliances. According to another embodiment, remote control 105 is a portable electronic device, such as a traditional sized universal remote control, a smart phone, a personal digital assistant, or the like. A set of appliances may include a heating system, a cooling system, lighting, window coverings, or other building or home systems, etc.

According to one embodiment, remote control 105 is configured to control the computer 115 via a set of command codes issued to the computer by the remote control. More specifically, the remote control is configured to control an application operating on the computer, such as a media application (e.g., iTunes™ Apple Inc., Cupertino Calif.), an Internet application (e.g., a Netflix™ application, Netflix, Inc. San Jose Calif., a Hulu™ application, Hulu, Inc., Los Angeles Calif., etc.) or the like operating on the computer. Computer 115 may be nearly any type of computer including a tablet computer, a lap top computer, a notebook computer, a personal digital assistant, a smartphone (e.g., an iPhone™ Apple Inc., Cupertino Calif.), a set-top box, a blaster, or any other type of processor, etc.

FIG. 1B is a simplified schematic of a remote control environment 100a showing in further detail the embodiment wherein the appliance 110f is a blaster and is configured to execute the below described functionality of remote control 105. Remote control environment 100 includes the set of appliances 110, computer 115, and remote server 120. Remote control 105 may be configured to execute the below described functionality or may be a device that is relatively more simple and sends command codes to the blaster where the blaster then sends the command codes to the set of appliances, including possibly the computer/processor for control of applications running on the computer/processor. In some embodiments, the blaster may itself host the applications and/or services. Remote control 105 may be a smart phone, a personal digital assistant, a hand-held universal remote control, a blaster, a tablet computer (including approximately hand sized tablet computers or larger tablet computers), or the like.

Figure 2A:
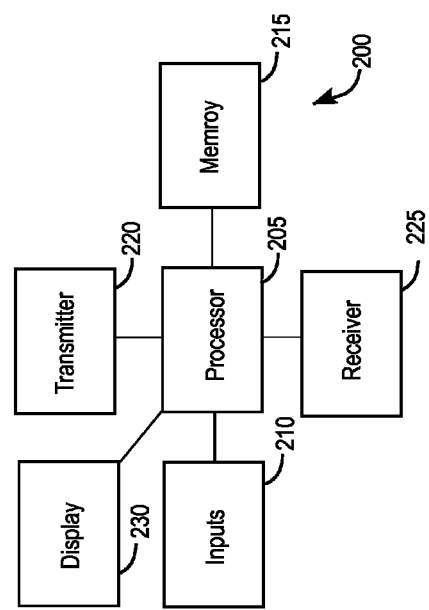
FIG. 2A is a simplified schematic of a set of elements 200 composing remote control 105 according to one embodiment.

FIG. 2A is a simplified schematic of a set of elements 200 composing remote control 105 according to one embodiment. The remote control may include a processor 205, such as a microprocessor, or alternatively may include a controller, such as a microcontroller. The remote control may also include a set of inputs 210 (e.g., buttons, sliders, etc.), a memory 215, a set of transmitters 220 (e.g., an IR transmitter, an RF transmitter, a visible light transmitter, etc.), a set of receivers 225 (e.g., an IR receiver, an RF receiver, a visible light receiver, etc.), and a display 230. According to one embodiment, a transmitter and a receiver may be combined as a transceiver. According to one embodiment, display 230 is a touch screen and the buttons and/or sliders are soft buttons and/or soft sliders that are displayed on the display. It is to be understood that each remote control according to each embodiment may not include all of the elements shown in FIG. 2A. For example, if remote control 105 is a blaster, the blaster may not include a display or might not include a set of buttons for triggering the transmission of command codes. For a blaster, the input might be the receiver, which is configured to receive command codes from another remote control where the other remote control might be a remote control according to one or more embodiments of the present invention.

According to one embodiment, memory 215 may include one or more of a variety of memories including a miniature hard disk drive, a solid state memory, etc. Memory 215 is configured to store computer code configured to embody one or more remote control operation methods of embodiments of the present invention. Memory 215 may also be configured to store one or more sets of command codes for controlling various appliances. Memory 215 may also be configured to store timing information, where the timing information includes the temporal spacings between command codes.

Figure 2B:
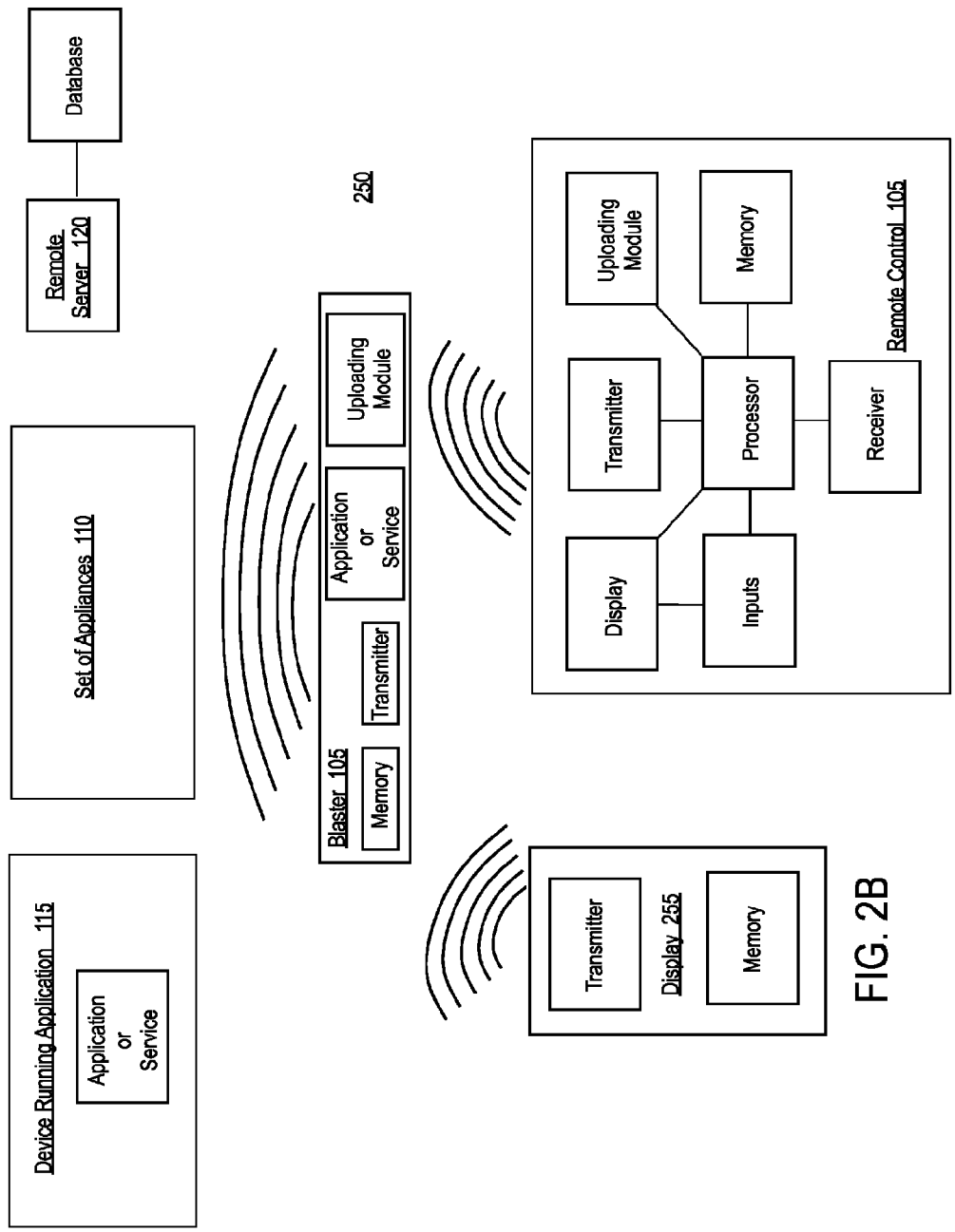
FIG. 2B is a simplified schematic of a set of components composing a remote control environment 250 according to another embodiment of the present invention.

In one embodiment, the various functions and operating method of the remote control, and/or the components composing the remote control are distributed on different devices. For instance, in one embodiment, a user interface module (typically included in a handheld device) of the remote control includes the user interface, and a transmitter transmitting command codes. In such an embodiment, the user interface module may be a software application on another device such as a smartphone. In one embodiment, the transmitted command codes are transmitted directly to the applications being controlled. In another embodiment, the transmitted command codes are transmitted to a blaster, which in turn communicates with (e.g., transmits command codes) to the appliances and/or applications being controlled. In one embodiment, the temporal lengths between command codes, optimized delays for command codes, sequences of command codes, etc. are stored on a processing module of the remote control. In one embodiment, this processing module of the remote control is in the same physical device as the blaster. In one embodiment, there is also an uploading module for communicating with a database wherein the uploading module uploads optimized temporal lengths between command codes, sequences of command codes, etc. to the database. In one embodiment, this uploading module is in the same physical device as the processing module. In one embodiment, the uploading module communicates directly with a remote database. In one embodiment, the uploading module communicates with a local computer, which in turn communicates with the remote database. In different embodiments, the user interface module, processing module, and uploading module may be in the same physical device or in different physical devices in any combination. FIG. 2B is a simplified schematic of a set of components composing a remote control environment 250 according to another embodiment of the present invention. Every component shown in remote control environment 250 may not be included in every embodiment of the remote control environment. For example, some embodiments might include the display 255, but not the remote control 105 (e.g., a traditional hand-held remote control). Further given components may be combined with other components. For example, the blaster 105 (e.g., a type of remote control that may be configured to execute the methods described herein) might be included in the set of appliances 110 in a set-top-box or the like. Further, some components may be further separated into stand alone components. For example, the uploading module might be included in a local computer 115 and not compose a portion of the blaster or the remote control. Further, various components of the remote control environment might include additional modules. For example, the blaster might include every module that is included in the remote control, but might not include the display.

Inter-Device Delay

FIG. 3 is a high-level flow diagram of a remote control operation method 300 according to one embodiment of the present invention. The high-level flow diagram is exemplary and is not limiting on the claims. Those of skill in the art will recognize that various steps may be added to the method, excluded from the method, or may be combined without deviating from the spirit and purview of the embodiment. The remote control operation method is generally directed at determining whether the temporal length between two command codes directed at two different appliances (sometimes referred to as a first appliance and a second appliance) is adequate so that the command codes directed at the two appliances may be "properly" executed by the two appliances. The "proper" execution of the set of command codes is described in further detail along with the description of the method steps below. The temporal length according to the embodiment of FIG. 3 is sometimes referred to as the inter-device delay because the first command code is directed at a first appliance and the second command code is directed at a second appliance. Although the command codes are directed at different appliances, it is often the case that all or many of the appliances receive and try to interpret all transmitted commands, since it is not clear whether any particular command code is directed toward a specific appliance. Thus, even though a particular command code may not be directed at an appliance, the appliance may be busy interpreting the command code nonetheless, and thus may not be ready to receive the next command code, which is directed at it. Thus, a certain temporal delay is needed between transmitted command codes although the command codes are directed at different appliances.

According to the embodiment described immediately below, the second command code is a power on command code for powering on the second appliance. The first command code may be one of a number of different command codes that the first appliance is configured to understand. It is noted that the first command code is not a command code the second appliance will understand and the second appliance will not execute a function for the second command code. While the method steps specifically discuss that the second command code is a power on command code, the method described below is not so limited. The second command code might be any command code that the second appliance is configured to understand and execute a function for.

At an initial step 305, remote control 105 receives an input (e.g., a button press, a received IR transmission if the remote control is a blaster, etc.) configured to direct the remote control to transmit a set of command codes to a set of appliances. The set of command codes may include the first command and the power on command code (or more generally a second command code that the second appliance is configured to understand and execute a function for). The set of command codes may be for an "activity." An activity includes the issuance of a number of command codes for a specific purpose and the execution of a number of functions on a set of appliances to achieve the specific purpose. For example, a "Watch DVD" activity might be associated with the functions of the DVD player turning on (first function), TV turning on (second function), the TV tuning to the DVD player input, e.g., HDMI input (third function), and the DVD player playing a DVD that is in the DVD player (fourth function). According to another example, an activity might be directed at a TV turning on and the TV tuning to a set-top-box input for a cable television provider. The TV turning on is a first function, and the TV tuning to the set-top-box input is a second function. The first function may be associated with a first command code for turning on the TV and the second function may be associated with a command code for changing the input of the TV to the set-top-box. The foregoing described activity might be associated with a given button on the remote control and might be the "Watch TV" activity where watching TV is the specific purpose of the activity. The button may be a hard button or may be a soft button on the display. It is understood that the foregoing described functions are exemplary and not limiting on the claims.

It is noted that a set of command codes is sometimes referred to as a macro. A set of command codes according to an embodiment of the present invention is not a fixed set. Various command codes may be added to, or removed from, a set of command codes so that an activity may be executed by a set of appliances. In one embodiment, such modifications to the set of command codes may be based on a knowledge of the current states of the various appliances. In one embodiment, such knowledge is communicated by the appliances to the remote control system. In another embodiment, such knowledge of the current states of various appliances is simulated by the remote control system, as described in U.S. Pat. No. 6,784,805, titled "State-Based Remote Control System" of Glen McLean Harris et al., assigned to the assignee of the instant application, and which is incorporated by reference herein in its entirety for all purposes.

Referring again to FIG. 3, at a step 310, the first command code is transmitted from the remote control, and after a first temporal length, the power on command code is transmitted from the remote control. At a step 315, the remote control receives an input to execute a "help" process on the remote control. The input to launch the help process might be from a "help" button on the remote control that is pressed by a user. Alternatively, the "input" to execute the help process may be generated by the remote control and not from an input received from a user. For example, the processor executing computer code supplied by the memory might generate the input to execute the help process. The help button might be pressed by a user if the power on command code is not properly executed by the second appliance. For example, if the first command code is for powering on a DVD player, and the second command is for powering on the TV, and if the TV is not powered on, then the user might press the help button to start a help process for getting help from the remote control with this problem.

At a step 320, the help process asks the user, via the display, a question regarding whether the second appliance is powered on (or more generally asks whether the second function or the second command code has been properly executed). If the remote control receives an input that the second appliance is powered on, the method ends, step 325. If the remote control receives an input that the second appliance is not powered on, the remote control re-transmits the power on command code, and logs in memory that the second appliance was not powered on by the set of command codes, step 330. The input may be received via the display (which may be a touch screen), and more specifically via soft buttons or the like displayed on the display. The steps in the remote control operation method may be repeated a number of times, until the memory has logged a given number of times (e.g., 5 times, 7 times, 10 times, etc.) that the second appliance has not been powered on by the set of command codes, step 335.

If the number of times that the second appliance has not been powered on is the given number of times, the remote control is configured to determine that the first temporal length should be lengthened, step 340. That is, if the second appliance is not powered on the given number of times by the set of command codes, the remote control is configured to determine that the failure is likely not associated with an arbitrary event, such as the transmission from the remote control to the second appliance being blocked my something, for example, a child, a pet, etc. moving between the remote control and the second appliance at the time the set of command codes is transmitted by the remote control.

Figure 4:
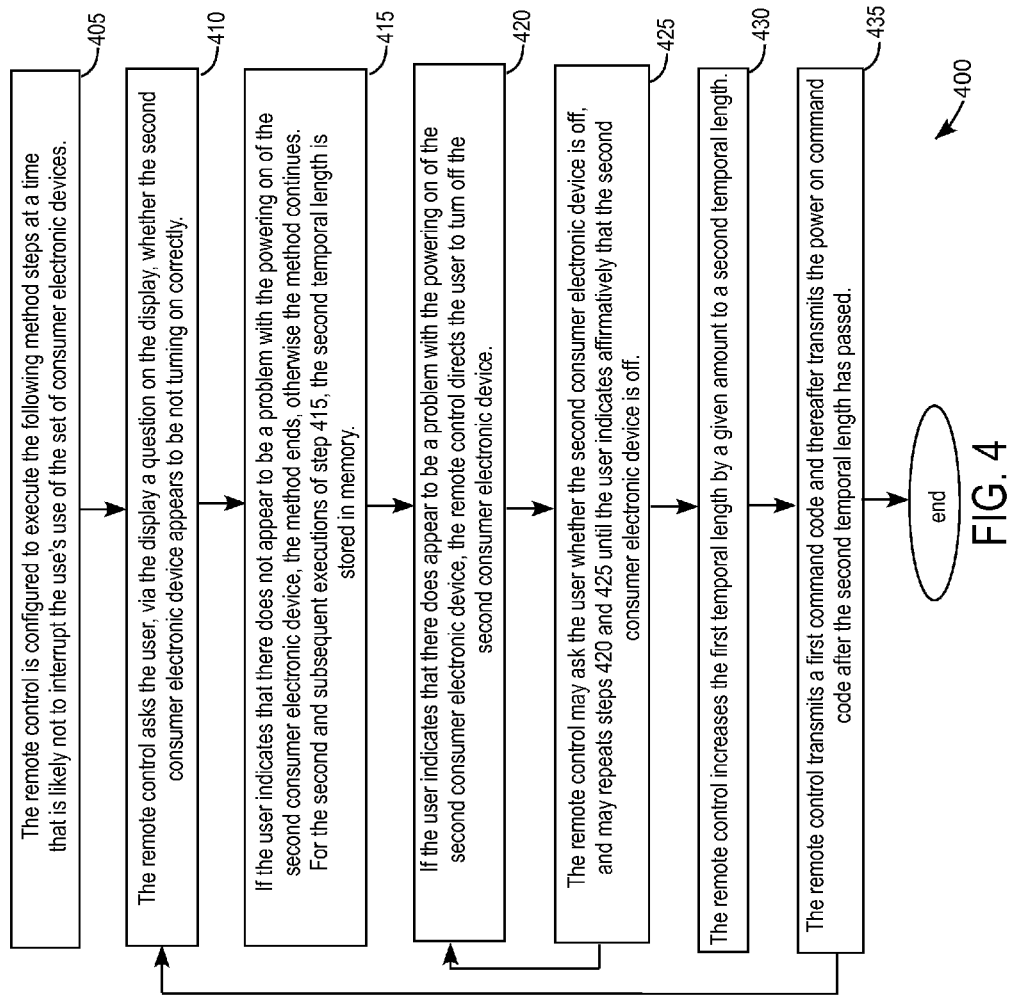
FIG. 4 is a high-level flow diagram of a temporal length adjustment method according to one embodiment of the present invention for lengthening the temporal length between the first command code and the power on command code.

If the number of times that the second appliance has not been powered on is the given number of times, the remote control is configured to lengthen the temporal length between the first command code and the power on command code (or more generally a second command code other than the power on command code). FIG. 4 is a high-level flow diagram of a temporal length adjustment method 400 according to one embodiment of the present invention for lengthening the temporal length between the first command code and the power on command code. The high-level flow diagram is exemplary and is not limiting on the claims. Those of skill in the art will recognize that various steps may be added to the method, or steps may be combined, without deviating from the spirit and purview of the embodiment. For example, while the following description of the temporal length adjustment method 400 includes the second command code being a power on command code, the second command code might be a command code other than a power on command code.

In accordance with one embodiment of the present invention, the temporal length adjustment method is an interactive method in which the remote control asks the user for input to aid the remote control to determine an appropriate temporal length for the set of command codes. Because the described temporal length adjustment method is an interactive method, the remote control is configured, in one embodiment, to execute the method at a time that is likely not to interrupt the user's use of the set of appliances, step 405. For example, the remote control is configured to determine a likely time that the user has stopped watching a television program, has stopped listening to a CD, has stopped watching a DVD program, etc. For example, the remote control might determine that a television movie that the user is watching ends at 10 p.m. The remote control might determine that the television movie ends at 10 pm based on the channel that the TV is turned to and an electronic program guide stored in memory. The remote control might know the length of time the CD plays or the DVD program plays based on the program guide. Alternatively, the remote control might determine that the user has stopped using a set of appliances via the remote control receiving one or more command codes to turn off a set of appliances, to change the input to a TV, to change the channel of a TV or set-top-box, to change a CD or a DVD, etc.

At a step 410, the remote control asks the user, via the display, whether the second appliance appears to be not turning on correctly. If the user indicates "no" (e.g., via a button press on the remote control) that there does not appear to be a problem with the powering on of the second appliance, the method ends, step 415. If the user indicates "yes" (e.g., via a button press on the remote) that there does appear to be a problem with the powering on of the second appliance, the remote control directs the user (e.g., via a direction on the display) to turn off the second appliance using the remote control, for example, step 420. The remote control may ask the user whether the second appliance is off, step 425, and may repeat steps 420 and 425 until the user indicates affirmatively that the second appliance is off. The input received from the user may be via the display (which may be a touch screen), and more specifically via soft buttons or the like displayed on the display.

At a step 430, the remote control increases the first temporal length by a given amount to a second temporal length. The first temporal length may be increased by the processor by adding a number of delay counts or the like to a timer configured to set the temporal length between command codes. Those of skill in the art will know of a number of other methods for increasing the temporal length between command codes to the second temporal length.

At a step 435, the remote control transmits a first command code and the power on command code to the set of appliances. The first command code may be the same command code for the same action, which was identified in the remote control operation method 300 as failing. For example, the first command code might be the power on command code for the DVD player, and the second command code may be the power on command code for the TV where these command codes are for the Watch DVD activity. The TV after receiving the first command code will not be able to execute a function for the first command code. According to one alternative embodiment, the first command code is selected by the remote control such that the first command code is not a command code that the second appliance (e.g., the TV) is configured to understand or execute a function for. That is, according to this alternative embodiment, the first command code is a "dummy" command from the perspective of the second appliance (e.g., the TV).

At the step 435, the power on command code is transmitted after the first command code at the time at which the second temporal length ends. The second appliance is configured to receive the first command code and begin processing this first command code to determine whether the second appliance can execute a function for the first command code. If the second temporal length passes, and the second appliance can receive the power on command code and execute the function of powering on, the second temporal length is sufficient. If the second appliance cannot receive the power on command code and/or cannot execute the function of powering on, the second temporal length is insufficient. In one embodiment, the remote control is configured to determine whether the second temporal length is sufficient by asking the user, via a question displayed on the display, whether the second appliance is powered on, repeat step 410. According to an alternative embodiment, if the second appliance is so equipped, the second appliance is configured to communicate to the remote control whether the second appliance it is powered on. If the remote control receives an affirmative answer (e.g., via a button press from a user) that the second consumer device is powered on, the remote control is configured to store the second temporal length in memory (e.g., store an increased counter value that sets temporal delay between the first command code and the power on command code to the second temporal length), repeat step 415. After the remote control stores the second temporal length, the method ends. The remote control will thereafter use the second temporal length for sets of command codes that include a power on command code for the second appliance.

If the remote control receives a negative answer (e.g., via a button press from a user) that the second consumer device is not powered on, the remote control is configured to determine that the second temporal length is too short. The remote control will then execute steps 420, 425 (possibly repeatedly), and execute steps 430, 435, 410, and 415 until the second appliance powers on (as determined at step 415) or until a maximum temporal length between the first command code and the power on command code is reached (e.g., 2 seconds). At step 430, the second temporal length is used as a new first temporal length. Thereby, the first temporal length and the second temporal length increases with each pass through the repeated steps. If the maximum temporal length is reached, the remote control may direct the user to use the remote server (e.g., use the remote server via the remote control or via the computer) for help in correcting the power on problem. Also, if the maximum temporal length between the command codes is reached and the second appliance does not turn on, then the remote control may be configured not to change the first temporal length.

According to one alternative embodiment of the present invention, the remote control may be in two-way communication with the appliance that receives the power on command code. The remote control may be configured to query the appliance to determine whether the appliance powered on correctly (alternative step 410) instead of asking a user of the remote control via the display whether the appliance powered on correctly. The presently described alternative method may proceed as in steps 415-435, but with the remote control communicating with the appliance via two-way communication to issue questions to the appliance and to collect input from the appliance instead of issuing questions to a user and collecting input from a user. The two-way communication link between the remote control and the appliance may be a bi-directional RF link, a bi-directional IR link, a bidirectional visible light link, a bidirectional wired link (e.g., USB link, an HDMI link, etc.), a bi-direction internet protocol (IP) link (e.g., communicated though a local wireless router or the like), etc.

According to one embodiment, the embodiments described with respect to FIG. 3 and FIG. 4 may be executed by the blaster. According to one embodiment, the user interface portion of the remote control may transmit the second temporal length stored in memory to the blaster, wherein the blaster is configured to store the second temporal length in the blaster's local memory. The blaster thereafter will use the second temporal length for sets of command codes that include a power on command code (or other command code) for the second appliance. The user interface portion of the remote control may be configured to directly transmit the second temporal length to the blaster or may transmit the second temporal length indirectly to the blaster via computer 115 and/or the remote server 120.

According to one specific embodiment, the remote control (for example, via computer 115 or directly via a wireless link) is configured to transfer the second temporal length to the remote server 120. The remote server may be configured to store the second temporal length in a database. The remote server may be configured so that other remote controls and/or other blasters may access the remote server via a user computer (or the like) to have the second temporal length downloaded to the other remote controls and/or other blasters so that these other remote controls and/or other blasters may use the second temporal length downloaded from the remote server. U.S. Pat. No. 7,436,319, titled "Method and Apparatus for Uploading and Downloading Remote Control Codes," of Glen McLean Harris et al., which is assigned to the assignee of the instant application, is incorporated by reference herein in its entirety, describes an apparatus and method for uploading and downloading command codes between a remote control and a remote server having a command code database.

According to another alternative embodiment, the remote control might be configured to receive an input where the user may request that the temporal length adjustment method be started. That is, the user might desire to have the temporal length adjustment method 400 started after the failure to the set of command codes has failed a single time, twice, etc. This is essentially a manual start of the temporal length adjustment method. The input to start the temporal length adjustment method might be provided via a hard button on the remote control, via a soft button on the display, via a soft button after the remote control starts a help process, or the like. In one embodiment, when the user requests the temporal length adjustment method, the pre-determined number of times that a command has to fail prior to the temporal length being adjusted is one.

Power-on Delay

Figure 5:
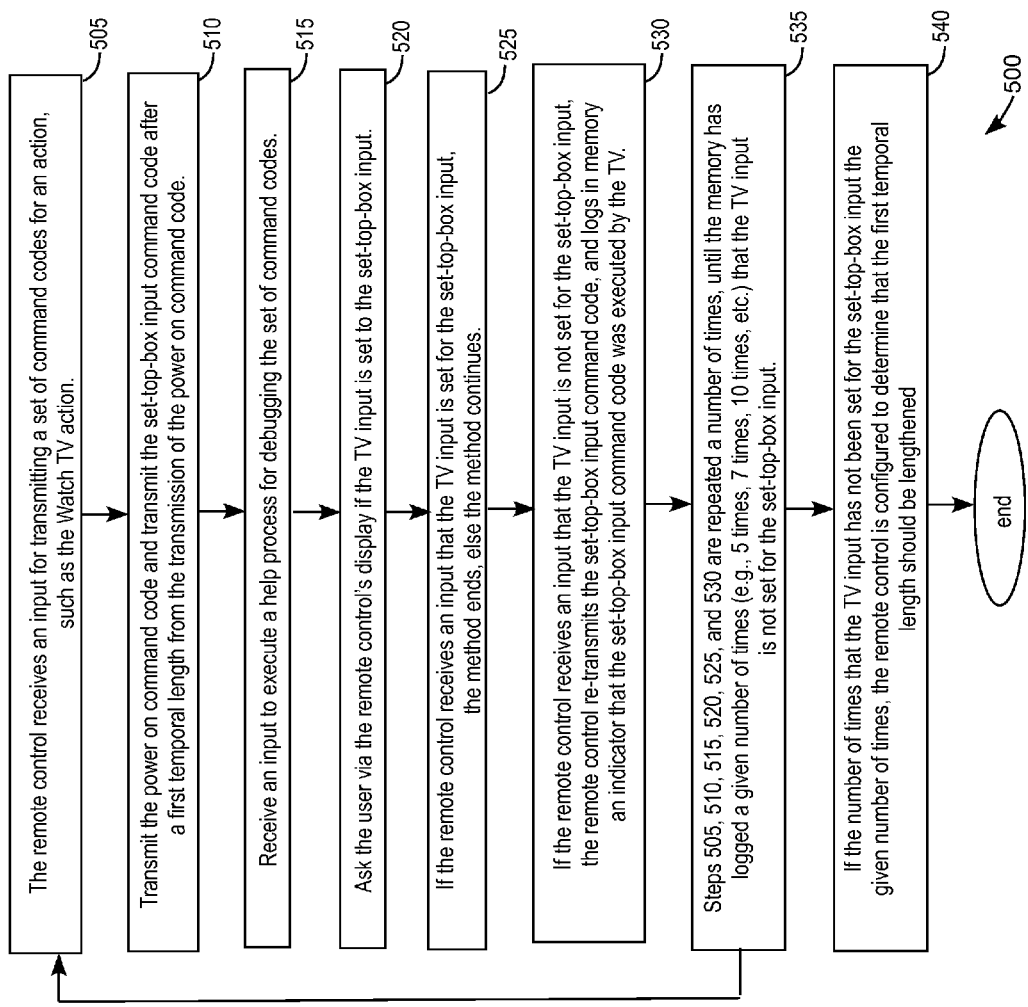
FIG. 5 is a high-level flow diagram of a remote control operation method according to one embodiment of the present invention for determining whether command code errors have occurred.

FIG. 5 is a high-level flow diagram of a remote control operation method 500 according to one embodiment of the present invention. The high-level flow diagram is exemplary and is not limiting on the claims. Those of skill in the art will recognize that various steps may be added to the method, or steps may be combined, without deviating from the spirit and purview of the embodiment. The remote control operation method is generally directed at determining whether the temporal length between two command codes (a first command code and a second command code) directed at a single appliance is adequate so that the appliance may properly execute the pair of command codes. The temporal length according to this embodiment is sometimes referred to as the power-on delay because the first command code is directed at powering on the appliance and the second command code is directed at another function of the appliance, such as selecting an input (e.g., set-top-box input, DVD player input, etc.). While the method steps specifically discuss that the second command code is for input selection of the appliance, the method described below is not so limited. That is, the second command code may be any of a number of command codes that the appliance is configured to execute a function for. Further, while the method steps specifically discuss that the method is executed for a TV, the method is not so limited and may be executed for other appliances, such as a DVD player, a surround sound system, a set-top-box, etc. The specific devices and specific activities/functions/commands mentioned herein are for illustrative purposes only, and are not intended to be limiting in any way.

At an initial step 505, remote control 105 receives an input (e.g., a button press, an received IR transmission if the remote control is a blaster, etc.) for the activity "Watch TV," and via the received input the remote control is configured to transmit the command codes for the Watch TV activity to the TV. The command codes for the activity Watch TV include the power on command code and the set-top-box input command code (i.e., change the TV to the set-top-box input).

At a step 510, the power on command code is transmitted from the remote control and after a first temporal length the set-top-box input command code is transmitted from the remote control. At a step 515, the remote control receives an input to execute a "help" process on the remote control. The user might initiate the help process on a display coupled to the remote control if the input in not properly set to the set-top-box input.

At a step 520, the help process asks the user, via the display, a question regarding whether the TV input is set for the set-top-box input. If the remote control receives an input (e.g., via a button press on the remote control from a user) that the TV input is set for the set-top-box input, the method ends, step 525. If the remote control receives an input (e.g., via a button press on the remote control from a user) that the TV input is not set for the set-top-box input, the remote control re-transmits the set-top-box input command code to set the proper input for the TV, and the remote control also logs in memory that the TV input was not set for set-top-box input for the activity Watch TV, step 530. Steps 505, 510, 515, 520, 525, and 530 in the remote control operation method may be repeated a number of times, until the memory has logged a given number of times (e.g., 5 times, 7 times, 10 times, etc.) that the TV input has not been set for the set-top-box input for the given activity, step 535.

If the number of times that the TV has not been set to the set-top-box input is the given number of times, the remote control is configured to determine that the first temporal length between the power on command and the set-top-box input command code should be lengthened, step 540. That is, if the TV is not set to the proper input the given number of times by the set of command codes for the activity, the remote control is configured to determine that the failure is likely not associated with an arbitrary event, and is associated with the temporal length between the power on command code and the set-top-box input command code.

Figure 6:
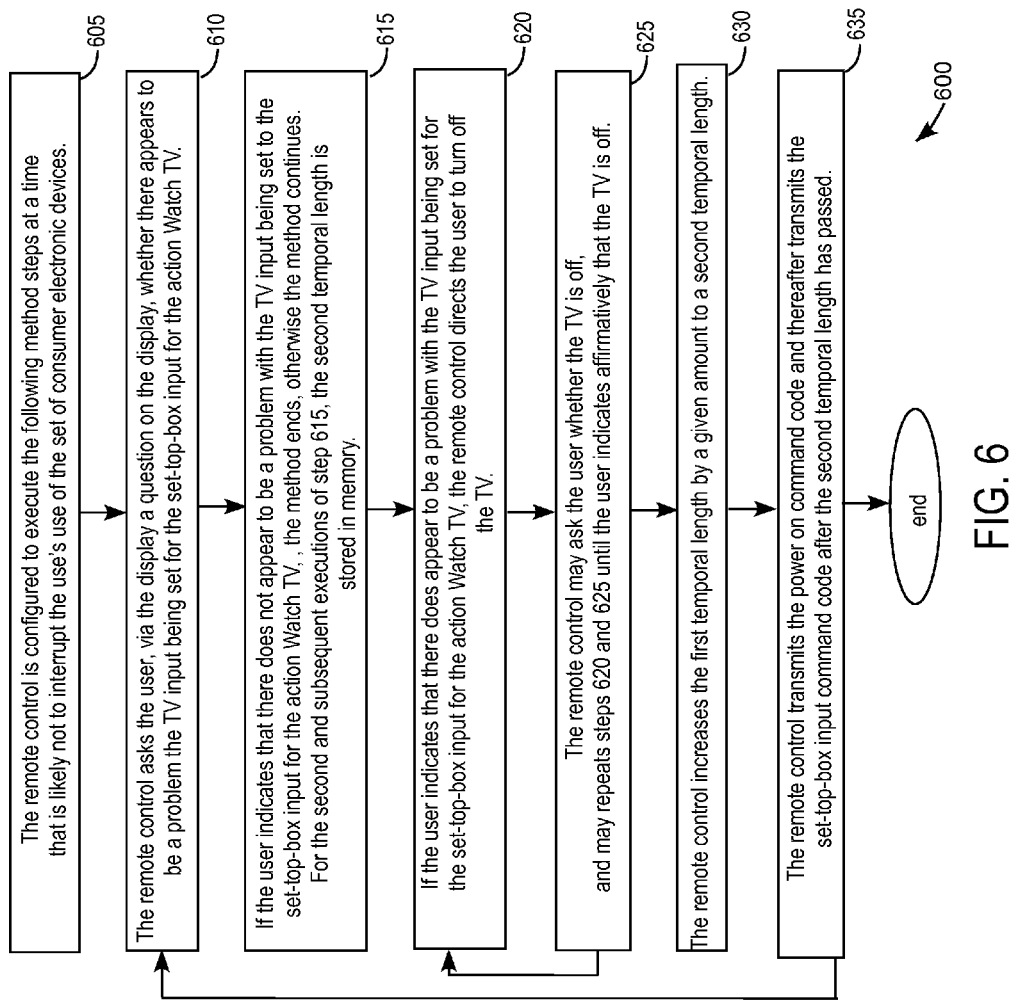
FIG. 6 is a high-level flow diagram of a temporal length adjustment method according to one embodiment of the present invention for lengthening the temporal length between the power on command code and the set-top-box input command code.

Additionally, if the number of times that the TV has not properly executed the pair of command codes, the remote control is configured lengthen the first temporal length to a second temporal length. FIG. 6 is a high-level flow diagram of a temporal length adjustment method 600 according to one embodiment of the present invention for lengthening the temporal length between the power on command code and the set-top-box input command code. The high-level flow diagram is exemplary and is not limiting on the claims. Those of skill in the art will recognize that various steps may be added to the method, or steps may be combined, without deviating from the spirit and purview of the embodiment.

The method of FIG. 6 is substantially similar to the method of FIG. 4 in that the temporal length adjustment method is an interactive method in which the remote control asks the user for input to aid the remote control to determine an appropriate temporal length for the set of command codes. According to one embodiment, the temporal length adjustment method is an interactive method, and therefore, the remote control is configured to execute the method at a time that is likely not to interrupt the user's use of the set of appliances, step 605. Generally acceptable times for executing the method for adjusting the temporal length are described above in detail with respect to the description of FIG. 4.

At a step 610, the remote control asks the user, via the display of a question on the displays, whether there appears to be a problem with input for the TV being set for the set-top-box input for the activity Watch TV. More generally, the question may be directed towards whether any second command code (for an activity) following a power on command code was executed correctly. It is to be understood that the method of FIG. 6 is not limited to the appliance being a TV and is not limited to a Watch TV activity. The method may be applied by the remote control for any appliance that the remote control is configured to control and for any activity where the first command code is a power on command code.

If the user indicates "no" (e.g., via a button press on the remote control) that there does not appear to be a problem with the TV being set to the set-top-box input, then the method ends, step 615. If the user indicates "yes" (e.g., via a button press on the remote control) that there does appear to be a problem with the TV being set to the set-top-box input, the remote control directs the user (e.g., via a direction on the display) to turn off the TV using the remote control, for example, step 620. The remote control may ask the user whether the TV is off, step 625, and then may repeat steps 620 and 625 until the user indicates affirmatively that the TV is off.

At a step 630, the remote control increases the first temporal length by a given amount to a second temporal length. Increasing the first temporal length to the second temporal length is described above in detail.

At a step 635, the remote control transmits the power on command code and the set-top-box input command code to the TV. The set-top-box input command code is transmitted after the power on command code is transmitted and is transmitted at the time that the second temporal length ends. If the second temporal length passes, and the TV can receive the set-top-box input command code and change the input to the set-top-box, then second temporal length is sufficient. If the second temporal length passes, and the TV cannot receive the set-top-box input command code and/or cannot change the input to the set-top-box, the second temporal length is insufficient. The remote control is configured to ask the user, via a question displayed on the display, whether there appears to be a problem with input on the TV being set for the set-top-box input, repeat step 610. If the remote control receives an answer (e.g., a button press on the remote control) that the input for the TV is for the set-top-box, the function for the set-top-box input command code is properly executed, the remote control is configured to store the second temporal length in memory (e.g., store an increased counter value that sets temporal delay to the second temporal length), repeat step 615. After the remote control stores the second temporal length, the method ends. The remote control will thereafter use the second temporal length for the given activity (e.g., turn on the TV and set the TV input to the set-top-box).

If the remote control receives an answer (e.g., a button press on the remote control) that the input for the TV is not for the set-top-box input, the remote control is configured to execute steps 620 and 625 (possibly repeatedly) until the TV is off, execute steps 630, 635, 610, and 615 until the input for the TV is set for the set-top-box (as determined at step 615) or until a maximum temporal length is reached (e.g., 2 seconds). If the maximum temporal length is reached, the remote control may direct the user to use the remote server (e.g., via the remote control or via the computer) for help in correcting the problem for the activity (e.g., the "Watch TV" activity). Also, if the maximum temporal length between the command codes is reached, then the remote control may be configured not to change the first temporal length.

According to an alternative embodiment, the remote control might be configured to receive an input where the user may request that the temporal length adjustment method 600 be started. That is, the user might desire to have the temporal length adjustment method 600 started after the failure to the set of command codes has failed a single time, twice, etc. This is essentially a manual start of the temporal length adjustment method. The input to start the temporal length adjustment method might be provided via a hard button on the remote control, via a soft button on the display, via a soft button after the remote control starts a help process, or the like. In one embodiment, when the user requests the temporal length adjustment method, the pre-determined number of times that a command has to fail prior to the temporal length being adjusted is one.

According to one alternative embodiment of the present invention, the remote control may be in two-way communication with the TV that receives the power on command code and then receives the set-top-box input command code. The remote control may be configured to query the TV to determine whether the TV is set to the set-top-box input (alternative step 610) instead of asking a user of the remote control whether the TV is set to the set-top-box input. The presently described alternative method may proceed as in steps 615-635, but with the remote control communicating with the TV via two-way communication to issue questions to the TV and to collect input from the TV instead of issuing questions to a user via the display and collecting input from a user. Two-way communication links are described in detail above with respect to the temporal length adjustment method 400.

According to one embodiment, methods 300, 400, 500, and 600 (described with respect to FIGS. 3, 4, 5, and 6) may be executed by the blaster. As discussed above with respect to FIG. 4 and FIG. 6, the remote control may transmit the second temporal length stored in memory to the blaster wherein the blaster is configured to store the second temporal length in the blaster's local memory. The blaster thereafter will use the second temporal length for sets of command codes that include a power on command code as the first command code transmitted to an appliance.

According to one specific embodiment, the remote control (for example, via computer 115 or directly via a wireless link) is configured to transfer the second temporal length to the remote server 120. The remote server may be configured to store the second temporal length in a database. The remote server may be configured so that other remote controls and/or other blasters may access the remote server via a user computer (or the like) to have the second temporal length downloaded to the other remote controls and/or the other blasters so that these other remote controls and/or other blasters may use the second temporal length downloaded from the remote server.

According to another embodiment, the remote control is configured to display a set of questions on the display to ask the user whether the user would like to manually fix a temporal length problem that the remote control has identified as a potential problem. According to one embodiment, the temporal length adjustment method is an interactive method, and therefore, the remote control is configured to execute the method at a time that is likely not to interrupt the user's use of the set of appliances. Generally acceptable times for executing the method for adjusting the temporal length are described above in detail with respect to the description of FIG. 4 and FIG. 6 above.

Figure 7:
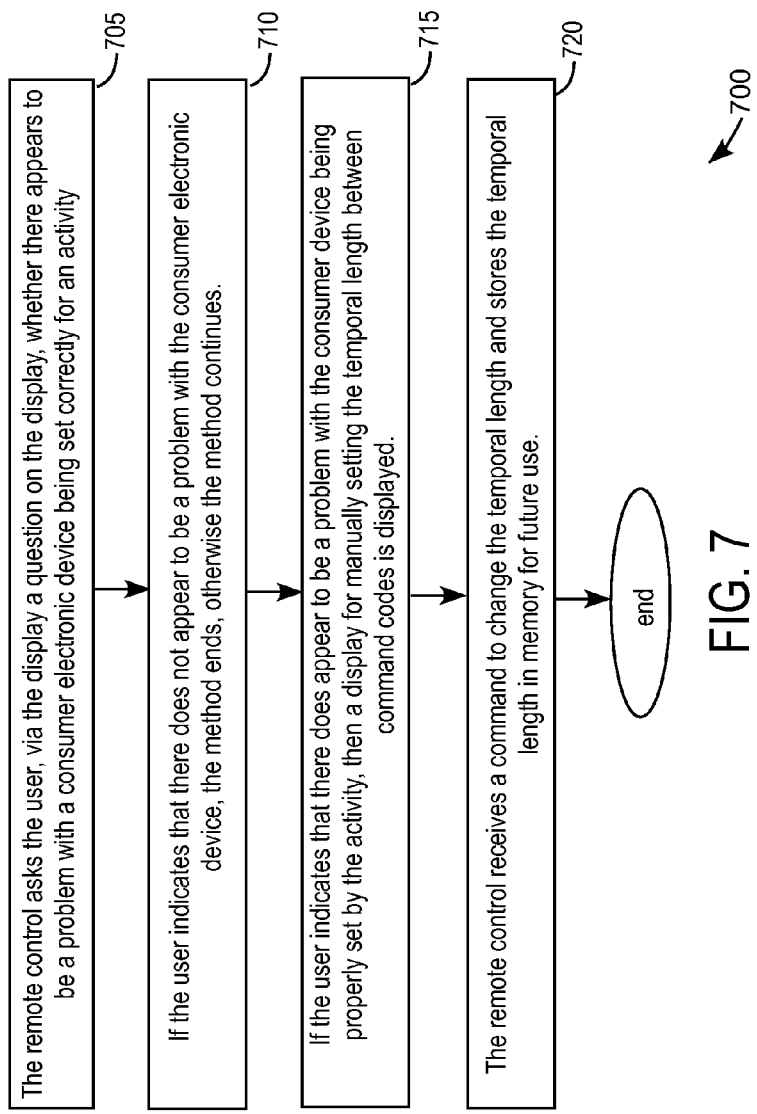
FIG. 7 is a high a high-level flow diagram of a remote control operation method 700 for manually fixing a temporal length delay problem according to one embodiment of the present invention.

FIG. 7 is a high-level flow diagram of a remote control operation method 700 for manually fixing a temporal length delay problem according to one embodiment of the present invention. The high-level flow diagram is exemplary and is not limiting on the claims. Those of skill in the art will recognize that various steps may be added to the method, excluded from the method, or may be combined without deviating from the spirit and purview of the embodiment. At a step 700, the remote control might ask the user, via the display, whether there appears to be a problem, for example with a given device not turning on properly, is not set to the proper input, or with any other command code type error associated with an activity. Alternatively, the remote control might receive a request from a user to fix a temporal length delay issued. The remote control might prompt the user as to whether the user wants to correct a power on delay problem, correct an inter device delay problem, etc. The remote control may be configured to allow the user to key in (or otherwise enter) a set of command codes, or an activity for which the user would like to adjust a temporal delay.

If the user indicates "no" (e.g., via a button press on the remote control) that there does not appear to be a problem with a particular activity or with a given appliance (e.g., a TV, a computer operating a media application, a DVD player, etc.), then the method ends, step 705. If the user indicates "yes" (e.g., via a button press on the remote control) that there does appear to be a problem with a particular activity or with a given appliance, then the remote control is configured to display on the display a guide for the user to adjust the temporal length between two command codes for which the remote control, the user, or another device (e.g., a blaster) has identified as a problem. The remote control may display on the display an instruction for the user to increase a temporal length between command codes via a given input (e.g., press a first button) on the remote control, and to decrease a temporal length between command codes via another input (e.g., press a second button), step 710. A default temporal length value for the specific command codes may be displayed on the display. The maximum and minimum temporal lengths might also be displayed. If the remote control receives an input to change the temporal length, the remote control may store the changed temporal length in memory for future use with the given set of command codes, step 715.

Inter Key Delay

According to one embodiment of the present invention, the remote control may be configured to transmit a plurality of command codes to an appliance, such as a TV to put the TV in a desired state. The plurality of command codes might include four channel-up command codes for example. The remote control might transmit the plurality of command codes based on an input received by the remote control from a user (e.g., four relatively temporally close button presses for channel up). Alternatively, the remote control might transmit the command codes as part of an activity or macro, or the plurality of command codes might be the entirety of command codes for an activity or macro. If the temporal lengths between the plurality of command codes is too short, then each command codes in the plurality of command codes might not be executed by the appliance. The temporal lengths between command codes that typically do not include power on command codes are relatively short. For example, the remote control might set an initial temporal length between two command codes for inter key delays at 1/10 of a second, whereas the initial temporal length may be approximately 1 second for two command codes where the first command code is a power on command code. If the remote control receives an input to start a help process after a plurality of command codes are transmitted from the remote control (where the plurality of command codes do not include a power on command), the remote control might log a failure for the plurality of command codes in memory and start a temporal length adjustment method (e.g., such as method 400 or 600) after a given number of failures (e.g., 5 failures) are logged in memory for the plurality of command codes.

Alternatively, the remote control might start a temporal length adjustment method after a single failure is logged for the failure of the plurality of command codes. The remote control might start the temporal length adjustment method after a single failure because the initial temporal lengths between the command codes is relatively short (e.g., 1/10 second) and the incremental increase in the temporal length might also be relatively short (e.g., 1/10 second) therefore the total transmission length of the plurality of command codes will remain relatively short (e.g., less than 1 to 2 seconds). Because the total transmission length will generally remain relatively short, the time taken by the appliance to execute the plurality of command codes will also remain relatively short such that a user using the remote control will not generally notice that that the total transmission length has been lengthened, or alternatively the total transmission length will not become so long that the user will be displeased/annoyed with the total time taken by the appliance to execute the plurality of command codes.

According to another alternative embodiment, the remote control might be configured to receive an input where the user may request that the temporal length adjustment method be started. This is essentially a manual start of the temporal length adjustment method. The input to start the temporal length adjustment method might be provided via a hard button on the remote control, via a soft button on the display, via a soft button after the remote control starts a help process, or the like.

The temporal length adjustment method for adjusting the inter key delay (the temporal lengths between inter key command codes, such as channel-up command codes) may be substantially similar to temporal length adjustment method 400 or 600 described above.

Input Delay

According to one embodiment of the present invention, the remote control may be configured to transmit a plurality of command codes to change the input of a TV or the like. TVs are often configured to change inputs serially. For example, if the TV has 5 inputs (e.g., HDMI 1, HDMI 2, component 1, component 2, and component 3), to change the input from HDMI 2 to component 2, two input down command codes may be transmitted to the TV to change the input from HDMI 2, to component 1, then to component 2. The two input down command codes may be transmitted to the TV if the remote control knows the input state of the TV is HDMI 2 (see U.S. Pat. No. 6,784,805, which is incorporated by reference herein in its entirety), and the users enters the activity for changing the input to component 2 (which might be the input the that DVD player is connected to) the remote control may then transmit two input down command codes to the TV. If the temporal lengths between the input down command codes (or alternatively input up command codes) is too short, the TV will not be able to receive and/or execute the two input down command codes, and the input of the TV will change by one input. According to the example being considered, the input would change from HDMI 2 to component 1, and would not change to component 2 after the change to component 1. If the remote control receives an input to start a help process after a plurality of command codes (e.g., input down command codes) are transmitted from the remote control, the remote control might log a failure for the plurality of command codes in memory and start a temporal length adjustment method (e.g., such as method 400 or 600) after a given number of failures (e.g., 5 failures) are logged in memory for the plurality of command codes. Alternatively, the remote control might start a temporal length adjustment method after a single failure is logged for the failure of the plurality of command codes. According to another alternative embodiment, the remote control might be configured to receive an input where the user may request that the temporal length adjustment method be started. This manual start of the temporal length adjustment method is described above in detail. The temporal length adjustment method for adjusting the input delay (e.g., the temporal lengths between input down command codes) may be substantially similar to temporal length adjustment method 400 or 600 described above.

Shortening of Temporal Lengths Between Command Codes and Optimizing the Sequence of Command Codes While the above discussion describes methods for lengthening of the temporal lengths between command codes so that a set of command codes may be executed properly by a set of appliances, it is generally desirable that the temporal lengths between command codes be as short as possible so that a set of command codes (e.g., for an activity or a macro) may be transmitted from a remote control or a blaster in generally the shortest amount of time possible where the command codes continue to be properly executed by the set of appliances. It is generally desirable to have a set of command codes transmitted from a remote control in generally the shortest amount of time possible so that the chance of the transmission is not interrupted by something moving in between the remote control and the set of appliances, or so that the user does not aim the remote control away from the set of appliances while the remote control is transmitting command codes. The shortest possible time for transmitting an entire set/sequence of codes is also desirable in that a quicker start of the desired activity enhances overall user experience.

According to one embodiment of the present invention, to shorten the length of the temporal length between command codes, at step 415 of the temporal length adjustment method 400, if the user indicates "no" that there does not appear to be a problem with the powering on of the second appliance (e.g., the TV), the method does not end and the temporal length between the first command code and the second command code is shortened by the remote control. The remote control may then power off the TV or direct the user to power off the second appliance and may ask the user whether the second appliance is powered off until the remote control receives an affirmative answer that the second appliance is powered off (e.g., substantially similar to the latter half of step 420 and to step 425). Method step 430 and 435 may then be executed with temporal lengths between the command codes being shortened (instead of lengthened) until the set command codes fails to execute properly. Thereafter, the last temporal length at which the set of command codes was properly executed may be stored in memory by the remote control for future use by the remote control. Alternatively, after the set of command codes fails as the temporal length is shortened, the temporal length may be incrementally lengthened as in the original steps 430 and 435 until the remote control receives an affirmative input that the command codes executed properly. The temporal length identified as being a "passing" temporal length may then be stored in memory by the remote control for future use by the remote control as the "optimized" temporal length. According to one embodiment, step 615 of the temporal length adjustment method 600 may be similarly changed for decreasing the temporal length between the first and the second command code. The remainder of the steps of temporal length adjustment method 600 may be similarly modified as described immediately above to determine and store a temporal length that has been shortened to decrease the amount of time that the remote control transmits the first and second command code.

According to one alternative method, the remote control provides an option wherein a user may start a temporal length adjustment method for lowering the temporal lengths between command codes to optimize the operation of the user's remote control. Methods for starting a temporal length adjustment method from a user input are described in detail above.

According to another embodiment of the present invention, the transmission order of two or more command codes in a set of command codes (e.g., for an activity) may be switched or otherwise rearranged so that the temporal lengths between the command codes may be shortened to reduce the transmission time of the set of command codes from the remote control. For example, a set of command codes may be issued for a multi command code activity, such as Watch DVD. One or more of the temporal spacings between the command codes for the Watch DVD activity might be able to be decreased by rearranging the transmission order of the command codes. The remote control might be configured to rearrange the transmission order of the command codes and thereafter start a temporal length adjustment method to shorten the temporal lengths between the command codes (described immediately above) for the activity or the like. If the temporal lengths cannot be shortened without the command codes failing, the remote control may be configured to restore the order of the command codes to an original order or otherwise leave the command codes in the same order but not reduce the temporal lengths. According to one embodiment of the present invention, the process for rearranging the transmission order of command codes may be initiated by the remote control or may be initiated by a user selecting an input on the remote control for starting this method. According to one embodiment, an optimized sequence of command codes (e.g., for a particular activity) is uploaded to a database for downloading to other remotes.

While various embodiments have been described above in the context of various delays (e.g., inter-device delays, power on delays, etc.), it is to be noted that the various embodiments may be employed (after suitable adaption, if needed) with any of the different types of delays described above. Furthermore, it is to be understood that the various embodiments described above may be used and adapted for other types of delays not specifically described herein. It is to be understood that the examples and embodiments described above are for illustrative purposes only and that various modifications or changes in light thereof will be suggested to persons skilled in the art, and are to be included within the spirit and purview of this application and scope of the appended claims. Therefore, the above description should not be understood as limiting the scope of the invention as defined by the claims.

What is claimed is:

1. A method for determining whether command code errors have occurred, the method comprising:
   receiving an input for directing a device to transmit a first command code and a second command code to a first appliance and a second appliance, respectively;

transmitting the first command code from the device;

transmitting the second command code from the device after a first temporal length from the transmission of the first command code;

determining whether the second command code was executed by the second appliance, wherein the determining step includes:

if the device receives an input that the second appliance did not execute the second command code, storing in memory an indicator that the second appliance did not execute the second command code, and retransmitting the second command code;

repeating by the device the receiving step, the first mentioned transmitting step, the second mentioned transmitting step, and the determining step, until the determining steps stores the indicator in memory a predetermined number of times; and determining by the device that the temporal length should be lengthened for the second appliance to execute the second command code if the indicator is stored in memory the predetermined number of times.

2. The method of claim 1, wherein the determining step includes determining by the device whether the second command code was executed by the second appliance.

3. The method of claim 1, wherein the determining step includes:

displaying a question on a display of the device regarding whether the second appliance executed the second command code; and if the device receives an input that the second appliance executed the second command code, ending the method.

4. The method of claim 1, wherein the predetermined number of times is five.

5. The method of claim 1, further comprising receiving a user input to start a help process, and wherein the help process executes the determining step.

6. The method of claim 5, wherein the input is received on the device.

7. The method of claim 5, wherein the input is received on a display in communication with the device from a user.

8. The method of claim 7, wherein the device includes the display.

9. The method of claim 1, wherein the second command code is a power on command code.

10. The method of claim 1, wherein the device is a handheld remote control.

11. The method of claim 1, wherein the device is a blaster configured to communicate with a remote control.

12. The method of claim 11, wherein the blaster is configured to run an application or a service.

13. A method for adjusting the temporal length between a first command code and a second command code, the method comprising:

transmitting the first command code from a device to an appliance;

transmitting the second command code from the device to the appliance after a first temporal length from the transmission of the first command code;

determining whether the appliance executed the second command code including:

if the device receives an input that the appliance executed the second command code, storing the first temporal length in memory, wherein the device is configured to use the first temporal length for subsequently received inputs for executing the action; and if the device receives an input that the appliance did not execute the second command code, lengthening on the device the first temporal length to a second temporal length; and until the first temporal length is not lengthened to the second temporal length or until the second temporal length is a maximum temporal length, repeating by the device the first mentioned transmitting step, the second mentioned transmitting step, and the determining step, wherein the first temporal length for the second mentioned transmitting step is set to the second temporal length.

14. The method of claim 13, wherein the determining step further includes displaying on the device a question whether the appliance executed a function for the second command code.

15. The method of claim 14, further comprising:

receiving an input in response to the question that second command code did not fail;

shortening the first temporal length to a second temporal length; and storing the second temporal length in memory for subsequent use by the device.

16. The method of claim 13, wherein the second command code is a power on command code for the appliance.

17. The method of claim 13, wherein the device is a handheld remote control.

18. The method of claim 16, wherein the first command code is not executable by the appliance.

19. The method of claim 13, further comprising determining by the device that the activity ended, and thereafter the executing by the device the first transmitting step, the second transmitting step, the determining step, and the repeating step.

20. The method of claim 13, wherein the device is a handheld remote control.

21. The method of claim 13, wherein the device is a blaster configured to communicate with a remote control.

22. The method of claim 21, wherein the blaster is configured to run an application or a service.

23. The method of claim 13, wherein the first appliance or the second appliance is a computer, and the first command code or the second command code is configured to control an application or a service operating on the computer.

24. The method of claim 13, wherein the set of command codes is for an activity.

25. The method of claim 12, further comprising transmitting from the device to a remote server the first temporal length stored in memory.

26. The method of claim 25, further comprising transmitting from the remote server the first temporal length to another device configured to control a set of appliances.

27. A method for adjusting the temporal length between a first command code and a second command code for an appliance, the method comprising:

transmitting the first command code from a device to an appliance;

transmitting the second command code from the device to the appliance after a first temporal length from the transmission of the first command code;

determining whether the appliance executed the second command code including:

if the device receives an input that the appliance executed the second command code, storing the first temporal length in memory, wherein the device is configured to use the first temporal length for subsequently received inputs for executing the activity, and if the device receives an input that the appliance did not execute the second command code, lengthening on the device the first temporal length to a second temporal length; and until the first temporal length is not lengthened to the second temporal length or until the second temporal length is a maximum temporal length, repeating by the device the first mentioned transmitting step, the second mentioned transmitting step, and the determining step, wherein the first temporal length for the second mentioned transmitting step is set to the second temporal length.

28. The method of claim 27, wherein the first command code is a power on command code for the appliance.

29. The method of claim 27, where in the determining step includes displaying on the device a question whether the appliance executed a function for the second command code.

30. The method of claim 29, further comprising:
receiving on the device an input in response to the question that second command code did not fail;
shortening by the device the first temporal length to a second temporal length; and
storing by the device the second temporal length in memory for subsequent use by the device.

31. The method of claim 27, further comprising determining by the device that the activity ended, and thereafter the executing by the device the first transmitting step, the second transmitting step, the determining step, and the repeating step.

32. The method of claim 27, wherein the device is a hand-held remote control.

33. The method of claim 27, wherein the device is a blaster configured to communicate with a remote control.

34. The method of claim 33, wherein the blaster is configured to run an application or a service.

35. The method of claim 27, wherein the appliance is a computer, and the first command code or the second command code is configured to control an application or a service operating on the computer.

36. The method of claim 27, wherein the set of command codes is for an activity.

37. The method of claim 27, further comprising transmitting from the device to a remote server the first temporal length stored in memory.

38. The method of claim 37, further comprising transmitting from the remote server the first temporal length to another device configured to control a set of appliances.

39. A control device system for controlling an appliance and determining a temporal length between the transmission of a first command code and a second command code so that the appliance may execute the second command code, the control device system comprising:
a processor configured to execute a set of computer code instructions;
a memory configured to store the set of computer code instructions, a set of command codes for controlling the appliances, and a temporal length value for the temporal length between the transmission of a first command code and a second command code to the appliance;
an input configured to receive an instruction to transmit the first command code and the second command code to the appliance; and
a transmitter configured to transmit the first command code and the second command code to the appliance,
wherein the processor is configured execute the computer code instruction to:
direct the transmitter to transmit the first command code from a device to an appliance;
direct the transmitter to transmit the second command code from the device to the appliance after a first temporal length from the transmission of the first command code;
determine whether the appliance executed the second command code including:
if the device receives an input that the appliance executed the second command code, storing the first temporal length in memory, wherein the device is configured to use the first temporal length for subsequently received inputs for executing the action; and
if the device receives an input that the appliance did not execute the second command code, lengthening on the device the first temporal length to a second temporal length; and
until the first temporal length is not lengthened to the second temporal length or until the second temporal length is a maximum temporal length, repeating by the processor the first mentioned direction step, the second mentioned directing step, and the determining step, wherein for repeated executions of the first mentioned direction step, the second mentioned directing step, and the determining step, the first temporal length for the second mentioned transmitting step is set to the second temporal length.

40. The control device system of claim 39, wherein the control device system is a blaster.

41. The control device system of claim 40, wherein the blaster is configured to run an application or a service.

42. The control device system of claim 39, wherein blaster is configured to be controlled by a remote control device and relay command codes to the appliance.

43. The control device system of claim 39, wherein the control device system is a hand-held remote control device.

44. The control device system of claim 39, wherein the appliance is a computer and the first or the second command codes are for controlling an application or service operating on the computer.

45. The control device system of claim 39, further comprising a display, wherein the processor is further configured to direct the display to display on the device a question whether the appliance executed a function for the second command code.

46. The control device system of claim 45, wherein the display is a touch screen via which the control device system is configured to receive input from a user.

47. The control device system of claim 46, wherein the display is configured to receive the input in response to the questions.

48. The control device system of claim 39, wherein the second command code is a power on command code for the appliance.

49. The control device system of claim 39, wherein the first command code is not executable by the appliance.

50. The control device system of claim 27, wherein the processor is configured to control the transmitter to transmit the first temporal length stored in memory to a remote server.

51. The control device system of claim 50, wherein the remote server is configure to transmit the first temporal length to another control device system.

* * * * *